(12) United States Patent
Kadous et al.

(10) Patent No.: US 8,351,456 B2
(45) Date of Patent: Jan. 8, 2013

(54) METHOD AND APPARATUS FOR RADIO FILTERING IN A MULTI-RADIO DEVICE

(75) Inventors: Tamer A. Kadous, San Diego, CA (US); Ashok Mantravadi, San Diego, CA (US)

(73) Assignee: QUALCOMM Incorporated, San Diego, CO (US)

( * ) Notice: Subject to any disclaimer, the term of this patent is extended or adjusted under 35 U.S.C. 154(b) by 367 days.

(21) Appl. No.: 12/683,879

(22) Filed: Jan. 7, 2010

(65) Prior Publication Data

US 2010/0329162 A1   Dec. 30, 2010

Related U.S. Application Data

(60) Provisional application No. 61/221,263, filed on Jun. 29, 2009.

(51) Int. Cl.
| | |
|---|---|
| *H04L 12/413* | (2006.01) |
| *H04W 4/00* | (2009.01) |
| *H04W 36/00* | (2009.01) |
| *H04W 72/00* | (2009.01) |

(52) U.S. Cl. ......... 370/445; 370/338; 455/453; 455/443
(58) Field of Classification Search .................. 370/328, 370/329, 320, 321, 335, 337, 343, 346, 338, 370/443, 445; 455/419, 509, 500, 67.11, 455/446, 453, 524, 525
See application file for complete search history.

(56) References Cited

U.S. PATENT DOCUMENTS 7,376,100 B2 * 5/2008 Chang ........................... 370/329
2009/0143095 A1 6/2009 Zhang
2010/0330977 A1 * 12/2010 Kadous et al. ................ 455/419
2010/0331029 A1 * 12/2010 Linsky et al. ................ 455/509

FOREIGN PATENT DOCUMENTS

| EP | 1589781 | 10/2005 |
|---|---|---|
| WO | WO2006053951 | 5/2006 |

OTHER PUBLICATIONS

International Search Report and Written Opinion—PCT/US2010/040449, International Search Authority—European Patent Office—Sep. 17, 2010.

* cited by examiner

*Primary Examiner* — Hahn Nguyen
(74) *Attorney, Agent, or Firm* — Rupit M. Patel

(57) ABSTRACT

Systems and methodologies are described herein that facilitate filtering or clustering of radios and/or other transceivers associated with a communication environment. As described herein, potentially conflicting transceivers supported by a communications device can be managed in an expedited fashion by filtering the transceivers into respective groups or clusters of transceivers that exhibit potential collisions. For example, clusters can be generated such that respective transceivers are associated with a single cluster and respective transceivers associated with a given cluster do not exhibit potential collisions with transceivers not associated with the given cluster. Clustering can be performed graphically as further described herein by generating and analyzing a graph that includes nodes corresponding to respective transceivers and edges representing potential conflicts therebetween. Additionally, resolution tables can be generated using substantially all combinations of conflicting transceivers within a set of transceivers, as determined based on an initial clustering and/or in any other suitable manner.

34 Claims, 13 Drawing Sheets

METHOD AND APPARATUS FOR RADIO FILTERING IN A MULTI-RADIO DEVICE

CROSS-REFERENCE

This application claims the benefit of U.S. Provisional Application Ser. No. 61/221,263, filed Jun. 29, 2009, and entitled "RADIO FILTERING FOR CONTROLLING OPERATION OF MULTIPLE RADIOS," the entirety of which is incorporated herein by reference.

BACKGROUND

I. Field

The present disclosure relates generally to communication systems, and more specifically to managing coexistence between multiple transceivers utilized by respective devices in a communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and Single-Carrier FDMA (SC-FDMA) systems.

Generally, a wireless multiple-access communication system can include a number of radios to support communication with different wireless communication systems. Respective radios can operate on certain frequency channels or bands or can have respective predefined requirements. In order to manage communication via multiple radios and avoid collisions and/or interference between respective radios, a coexistence manager (CxM) and/or other means can be utilized to coordinate between respective radios that are in collision (e.g., radios configured such that their mutual operation would cause significant interference on at least one of the radios). To these ends, it would be desirable to implement techniques for filtering and grouping radios in order to expedite management operations performed with respect to such radios.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a set of transceivers to be resolved at a given time interval; obtaining information relating to potential pairwise collisions between respective transceivers in the set of transceivers; and dividing the set of transceivers into respective non-overlapping clusters of one or more transceivers such that respective transceivers in the set of transceivers are associated with a single cluster and respective transceivers associated with a given cluster do not exhibit potential pairwise collisions with transceivers not associated with the given cluster.

A second aspect described herein relates to a wireless communications apparatus, which can comprise a memory that stores data relating to a set of transceivers to be resolved at a given time interval. The wireless communications apparatus can further comprise a processor configured to obtain information relating to potential pairwise collisions between respective transceivers in the set of transceivers and to divide the set of transceivers into respective non-overlapping clusters of one or more transceivers such that respective transceivers in the set of transceivers are associated with a single cluster and respective transceivers associated with a given cluster do not exhibit potential pairwise collisions with transceivers not associated with the given cluster.

A third aspect relates to an apparatus, which can comprise means for obtaining information relating to respective associated transceivers and potential pairwise conflicts between the respective associated transceivers and means for filtering the respective associated transceivers into one or more clusters such that respective transceivers are associated with only a single cluster and respective transceivers have potential pairwise collisions only with transceivers in a common cluster.

A fourth aspect described herein relates to a computer program product, which can include a computer-readable medium that comprises code for causing a computer to code for causing a computer to obtaining information relating to respective associated radios and potential pairwise conflicts between the respective associated radios and code for causing a computer to filter the associated radios into one or more clusters such that respective radios are associated with only a single cluster and respective radios have potential pairwise collisions only with radios in a common cluster.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
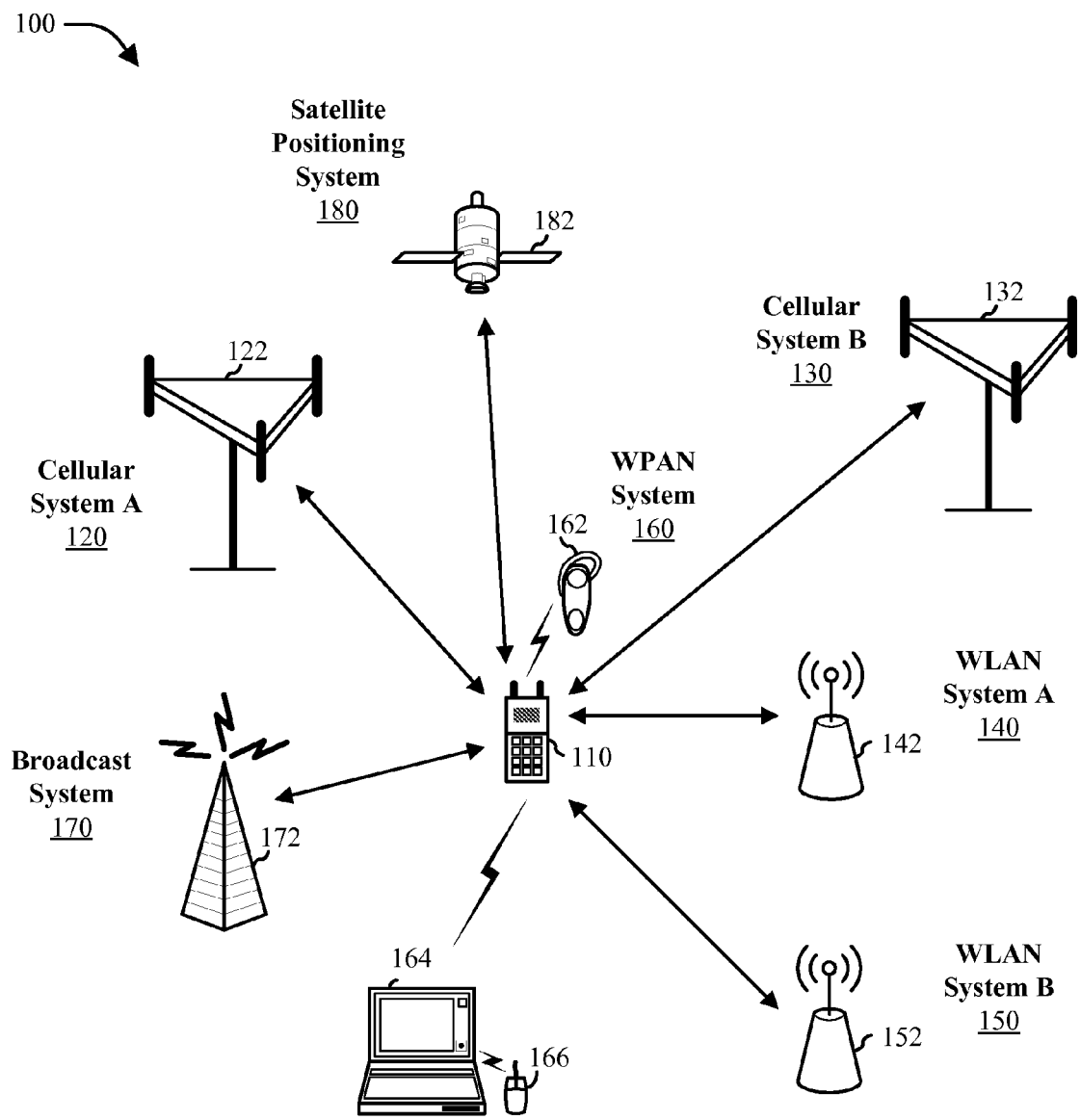
FIG. 1 is a block diagram of an example wireless communication environment in which various aspects described herein can function.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, it can be appreciated that various illustrative logical blocks, modules, circuits, algorithm steps, etc., described in connection with the disclosure herein can be implemented as electronic hardware, computer software, or combinations of both. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the disclosure herein can additionally or alternatively be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, or alternatively the processor can be any conventional processor, controller, microcontroller, state machine, or the like. A processor can also be implemented as a combination of computing devices, e.g., a combination of a DSP and a microprocessor, a plurality of microprocessors, one or more microprocessors in conjunction with a DSP core, or any other such configuration.

Furthermore, various functions of one or more example embodiments described herein can be implemented in hardware, software, firmware, or any combination thereof. If implemented in software, the functions can be stored on or transmitted as one or more instructions or code on a computer-readable medium. Computer-readable media can include both computer storage media and communication media. Communication media can include any medium that facilitates transfer of a computer program from one place to another. Likewise, storage media can include any available media that can be accessed by a general purpose or special purpose computer. By way of example, and not limitation, computer-readable media can comprise RAM, ROM, EEPROM, CD-ROM, digital versatile disc (DVD), blu-ray disc, or other optical disk storage, magnetic disk storage or other magnetic storage devices, and/or any other medium that can be used to carry or store desired program code means in the form of instructions or data structures and that can be accessed by a general-purpose or special-purpose computer or a general-purpose or special-purpose processor. Further, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and/or microwave, then such means are intended to be included in the definition of medium. "Disk" and "disc," as used herein, includes compact disc (CD), laser disc, optical disc, DVD, floppy disk, and blu-ray disc, where "disks" generally reproduce data magnetically while "discs" reproduce data optically (e.g., with lasers). Combinations of the above can also be included within the scope of computer-readable media.

Referring now to the drawings, FIG. 1 illustrates an example wireless communication environment 100 in which various aspects described herein can function. Wireless communication environment 100 can include a wireless device 110, which can be capable of communicating with multiple communication systems. These systems can include, for example, one or more cellular systems 120 and/or 130, one or more wireless local area network (WLAN) systems 140 and/or 150, one or more wireless personal area network (WPAN) systems 160, one or more broadcast systems 170, one or more satellite positioning systems 180, other systems not shown in FIG. 1, or any combination thereof. It should be appreciated that in the following description the terms "network" and "system" are often used interchangeably.

Cellular systems 120 and 130 can each be a CDMA, TDMA, FDMA, OFDMA, SC-FDMA, or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, cellular system 120 can include a number of base stations 122, which can support bi-directional communication for wireless devices within their coverage. Similarly, cellular system 130 can include a number of base stations 132 that can support bi-directional communication for wireless devices within their coverage.

WLAN systems 140 and 150 can respectively implement radio technologies such as IEEE 802.11 (Wi-Fi), Hiperlan, etc. WLAN system 140 can include one or more access points 142 that can support bi-directional communication. Similarly, WLAN system 150 can include one or more access points 152 that can support bi-directional communication. WPAN system 160 can implement a radio technology such as Bluetooth, IEEE 802.15, etc. Further, WPAN system 160 can support bi-directional communication for various devices such as wireless device 110, a headset 162, a computer 164, a mouse 166, or the like.

Broadcast system 170 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, broadcast system 170 can include one or more broadcast stations 172 that can support one-way communication.

Satellite positioning system 180 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, satellite positioning system 180 can include a number of satellites 182 that transmit signals used for position determination.

In an aspect, wireless device 110 can be stationary or mobile and can also be referred to as a user equipment (UE), a mobile station, a mobile equipment, a terminal, an access terminal, a subscriber unit, a station, etc. Wireless device 110 can be a cellular phone, a personal digital assistant (PDA), a wireless modem, a handheld device, a laptop computer, a cordless phone, a wireless local loop (WLL) station, etc. In addition, wireless device 110 can engage in two-way communication with cellular system 120 and/or 130, WLAN system 140 and/or 150, devices within WPAN system 160, and/or any other suitable system(s) and/or device(s). Wireless device 110 can additionally or alternatively receive signals from broadcast system 170 and/or satellite positioning system 180. In general, it can be appreciated that wireless device 110 can communicate with any number of systems at any given moment.

Figure 2:
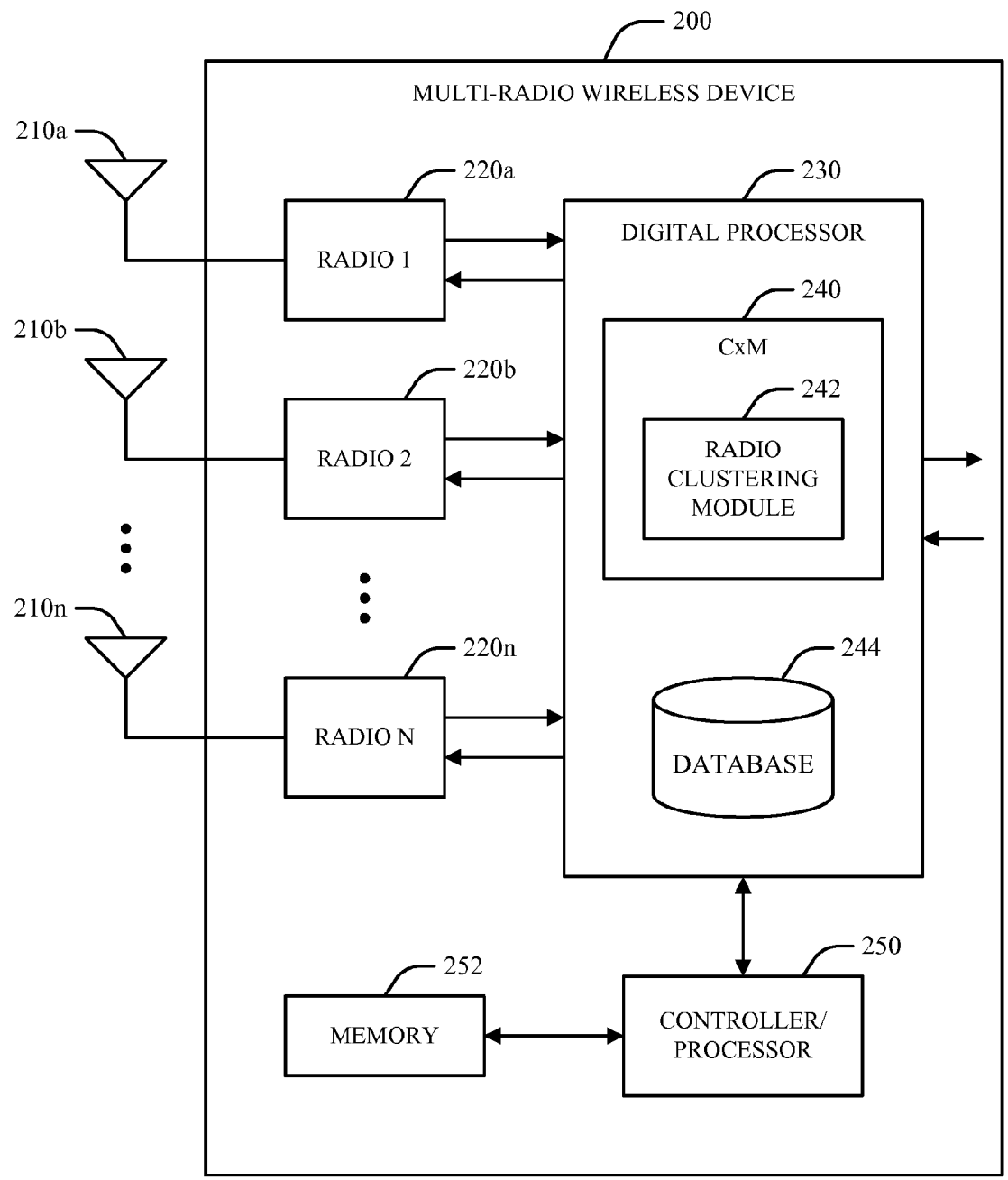
FIG. 2 is a block diagram of an example wireless device that can be operable to manage coexistence between respective radios in an associated wireless communication system in accordance with various aspects.

Turning next to FIG. 2, a block diagram is provided that illustrates an example design for a multi-radio wireless device 200. As FIG. 2 illustrates, wireless device 200 can include N radios 220a through 220n, which can be coupled to N antennas 210a through 210n, respectively, where N can be any integer value. It should be appreciated, however, that respective radios 220 can be coupled to any number of antennas 210 and that multiple radios 220 can also share a given antenna 210.

In general, a radio 220 can be a unit that radiates or emits energy in an electromagnetic spectrum, receives energy in an electromagnetic spectrum, or generates energy that propagates via conductive means. By way of example, a radio 220 can be a unit that transmits a signal to a system or a device or a unit that receives signals from a system or device. Accordingly, it can be appreciated that a radio 220 can be utilized to support wireless communication. In another example, a radio 220 can also be a unit (e.g., a screen on a computer, a circuit board, etc.) that emits noise, which can impact the performance of other radios. Accordingly, it can be further appreciated that a radio 220 can also be a unit that emits noise and interference without supporting wireless communication.

In accordance with one aspect, respective radios 220 can support communication with one or more systems. Multiple radios 220 can additionally or alternatively be used for a given system, e.g., to transmit or receive on different frequency bands (e.g., cellular and PCS bands).

In accordance with another aspect, a digital processor 230 can be coupled to radios 220a through 220n and can perform various functions, such as processing for data being transmitted or received via radios 220. The processing for each radio 220 can be dependent on the radio technology supported by that radio and can include encryption, encoding, modulation, etc., for a transmitter; demodulation, decoding, decryption, etc., for a receiver, or the like. In one example, digital processor 230 can include a coexistence manager (CxM) 240 that can control the operation of radios 220 in order to improve the performance of wireless device 200 as generally described herein. CxM 240 can have access to a database 244, which can store information used to control the operation of radios 220.

For simplicity, digital processor 230 is shown in FIG. 2 as a single processor. However, it should be appreciated that digital processor 230 can comprise any number of processors, controllers, memories, etc. In one example, a controller/processor 250 can direct the operation of various units within wireless device 200. Additionally or alternatively, a memory 252 can be used to store program codes and data for wireless device 200. Digital processor 230, controller/processor 250, and memory 252 can be implemented on one or more integrated circuits (ICs), application specific integrated circuits (ASICs), etc. By way of specific, non-limiting example, digital processor 230 can be implemented on a Mobile Station Modem (MSM) ASIC.

Figure 3:
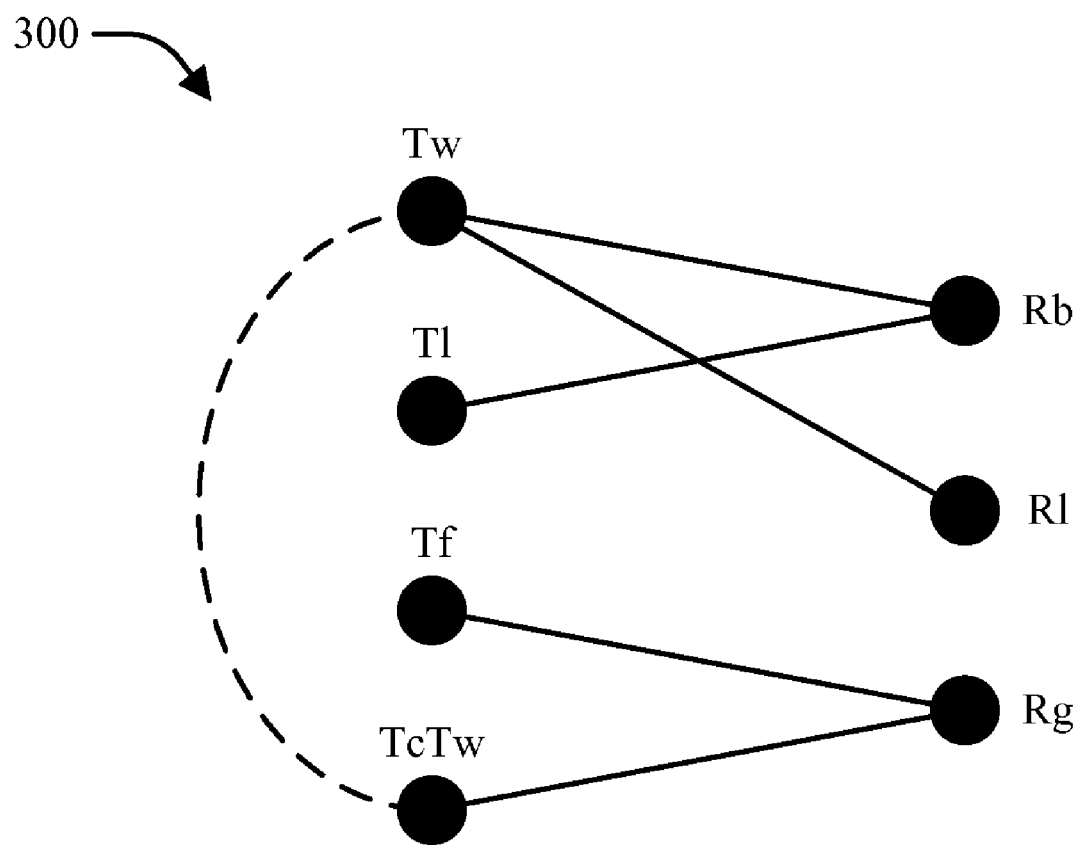
FIG. 3 illustrates an example set of radios that can be implemented in a wireless communication environment and respective potential collisions that can occur among the example set of radios.

In accordance with one aspect, CxM 240 can be utilized to manage operation of respective radios 220 utilized by wireless device 200 in order to avoid interference and/or other performance degradation associated with collisions between respective radios 220. By way of further illustration, graph 300 in FIG. 3 represents respective potential collisions between seven example radios in a given decision period. In the example shown in graph 300, the seven radios include a WLAN transmitter (Tw), an LTE transmitter (Tl), an FM transmitter (Tf), a GSM/WCDMA transmitter (Tc), an LTE receiver (Rl), a Bluetooth receiver (Rb), and a GPS receiver (Rg). The four transmitters are represented by four nodes on the left side of graph 300, and the three receivers are represented by three nodes on the right side of graph 300. A potential collision between a transmitter and a receiver is represented on graph 300 by a branch connecting the node for the transmitter and the node for the receiver. Accordingly, in the example shown in graph 300, collisions may exist between (1) a WLAN transmitter (Tw) and a Bluetooth receiver (Rb); (2) a LTE transmitter (Tl) and a Bluetooth receiver (Rb); (3) a WLAN transmitter (Tw) and a LTE receiver (Rl); (4) a FM transmitter (Tf) and a GPS receiver (Rg); and (5) a WLAN transmitter (Tw), a GSM/WCDMA transmitter (Tc), and a GPS receiver (Rg).

Figure 4:
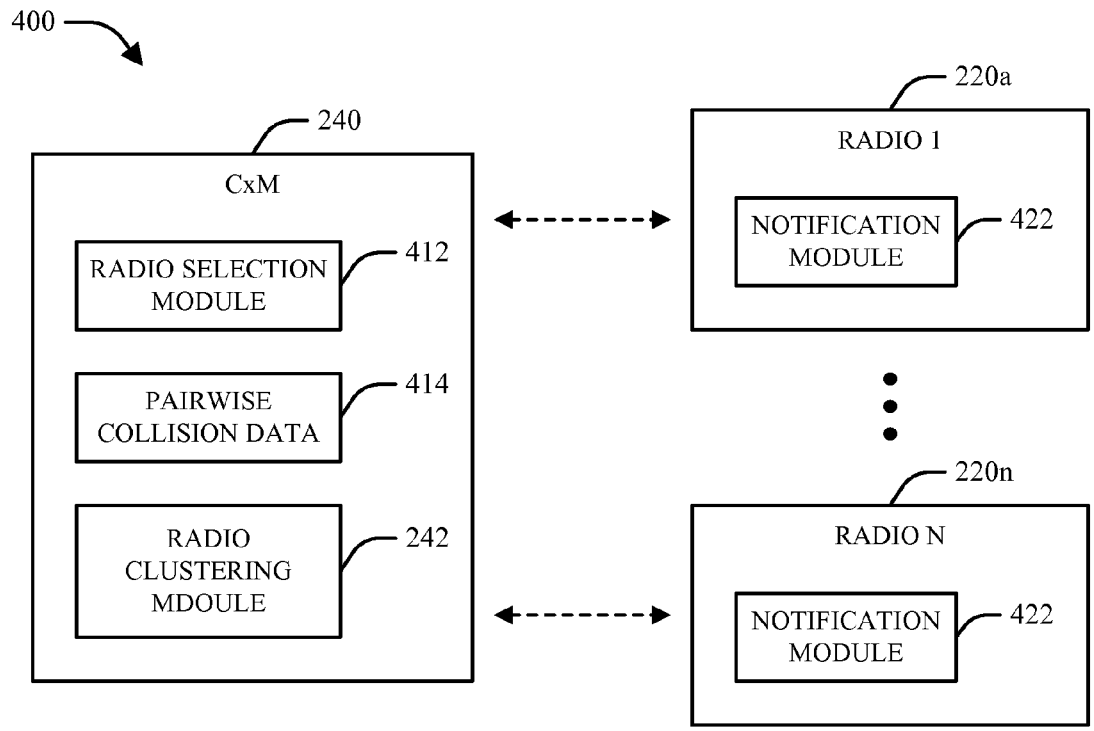
FIG. 4 is a block diagram of a system for clustering respective radios associated with a multi-radio communication environment in accordance with various aspects.

In accordance with another aspect, CxM 240 can leverage the functionality of a radio clustering module 242 and/or any other suitable components to group or filter respective radios 220 into radio clusters, which can in turn be utilized to facilitate subsequent management operations for radios 220. Referring to FIG. 4, a block diagram of a system 400 is provided that illustrates the operation of radio clustering module 242 in further detail. As shown in FIG. 4, system 400 can include a CxM 240, which can be utilized to monitor respective radios 220 and arbitrate and/or otherwise coordinate between one or more radios 220 that are in collision (e.g., such that mutual operation of the radios 220 causes severe interference to at least one of them). In one example, CxM 240 can include a radio selection module 412 that can identify event request (ER) messages, event notifications, and/or other suitable messages from respective radios 220 (e.g., via notification modules 422 at the respective radios) and utilize such information to identify a set of radios 220 to be processed at a given time interval (e.g., a decision unit or DU). Based on determinations from radio selection module 412 and a set of pairwise collision data 414 relating to potential collisions between respective radios 220, a radio clustering module 242 at CxM 240 can divide or filter the respective radios 220 identified by radio selection module 412 into respective groups or clusters.

With respect to the operation of system 400 and respective subsequently illustrated and described systems, it should be appreciated that while respective operations are described in relation to clustering and filtering of "radios," the techniques and/or mechanisms as described herein could be applied to any suitable radio(s) or, more generally, to any suitable transceiver(s) employed within a wired communication system, a wireless communication system, and/or any other suitable communication system. Further, it should be appreciated that the hereto appended claims are not intended to be limited to any specific implementation(s) unless explicitly stated otherwise.

In accordance with one aspect, after respective notifications for a current DU and/or other time unit have been received by CxM 240, radio selection module 412 can identify respective events that are to be considered for evaluation in the current DU. In one example, radio selection module 412 can consider three kinds of events. First, events that have started in past DUs and are ongoing in the current DU can be considered. In one example, this class of events can include events that were granted in the past and are being executed currently, as well as those events that were denied in the past but can still be granted. Second, immediate events that start at the next DU (e.g., substantially immediately after receiving the response in the current DU) can be considered. Third, future events that start in DUs after the next DU can be considered (e.g., in the case that radios 220 are allowed to report on an event multiple DUs before the start of the event).

In one example, decisions can be made by CxM 240 in a given DU for only ongoing and immediate events, which are referred to herein collectively as "current events." However, it can be appreciated that future events could also impact decisions on current events. For example, CxM 240 could choose to deny an immediate event in a case where the immediate event conflicts with a future event and it is more desirable to deny the immediate event than to grant it and preempt it at a later point. Thus, in such a case, it can be appreciated that future events can also be considered in the evaluation for a current DU. In contrast, however, it can be appreciated that respective events that begin beyond the maximum end time of respectively identified immediate events may not need to be considered in all cases. By way of specific example, if only one ongoing event and one future event are identified, a decision can be deferred by CxM 240 to the start of the future event. As used herein and generally in the art, the maximum end time of respectively identified immediate events is referred to as the "event horizon" for the current DU.

Thus, in view of the above, it can be appreciated that events identified by radio selection module 412 for evaluation in a given DU can include 1) current events (e.g., ongoing and immediate events) as well as 2) future events whose start times are less than the event horizon. As used herein, such events identified for consideration in a DU are referred to as "active events."

Once the active events in a given DU and their corresponding radios 220 are determined by radio selection module 412, radio clustering module 242 can separate the respective events and/or radios into groups that do not impact each other. As used herein, "no impact" refers to a scenario in which decisions on respective events in a given group does not affect decisions on respective events in a different group (e.g., such that each group of events can be processed independently by CxM 240). As further used herein, such groups of events or radios are referred to as clusters, and the process of determining such clusters (e.g., as performed by radio clustering module 242) is referred to herein as radio clustering or radio filtering. In accordance with one aspect, clustering can be performed by radio clustering module 242 on the basis of radios 220 rather than events due to the fact that a potential conflict between two radios 220 implies a potential conflict between their events. In one example, a radio 220 can be considered by radio clustering module 242 if it has at least one active event.

In accordance with one aspect, radio clustering module 242 can perform radio filtering or clustering based at least in part on pairwise collision data 414 relating to potential radio conflicts, as determined based on underlying interference mechanisms or the like. In one example, an interference mechanism can be expressed in terms of an aggressor radio causing interference a victim radio. While in some cases an aggressor radio is a transmitter radio and a victim radio is a receiver radio, it should be appreciated that an interference mechanism can exist between any suitable combination of radios 220. In another example, a pair of radios 220 that do not exhibit a conflict with each other can in some cases become conflicting in the presence of a third radio 220. By way of specific, non-limiting example, if there are two transmitter radios T1 and T2 and a receiver radio R3, in some cases the combination of T1, T2, and R3 may cause a conflict even when the individual radio combinations T1R3 and T2R3 do not conflict. As used herein and generally in the art, such conflicts are referred to as three radio conflicts or mechanisms.

It should be appreciated that the definition of a conflict as used herein does not depend on the specific parameters (e.g., powers, sub-bands, etc.) reported by respective radios 220 in the data plane. Rather, a pair of radios 220 can be regarded as conflicting if there is any set of radio parameters within the relevant range that cannot co-exist between the radios 220. By way of specific example, LTE operating in band class 7 (BC7) may be able to co-exist with Bluetooth (BT) in the industrial, scientific, and medical (ISM) band for certain BT channels. However, since there are at least some combinations of channels, LTE transmit power and BT received signal strength indication (RSSI) that cannot co-exist, these two radios can be regarded as conflicting with each other. Such conflict information can be static (e.g., based only on the radios and bands supported by a given device). Alternatively, a more dynamic determination of radio conflicts can be employed, where the relevant range of parameters is adjusted based on long term parameters (e.g., as determined by one or more control plane entities at CxM 240). Thus, referring back to the above example, if the LTE radio were to perform an inter-frequency handover and move away from the ISM band, it may in some cases no longer conflict with BT.

In accordance with one aspect, pairwise collision data 414 structured as provided above can be made available a priori to radio clustering module 242. Using pairwise collision data 414, radio clustering module 242 can determine respective clusters of radios 220 whose decisions impact each other. For example, if there are two separate conflicts between radio combinations T1R3 and T2R3, a joint decision on T1T2R3 could be needed to ensure that radios T1 and T2 do not cause a resolution conflict at radio R3.

Figure 5:
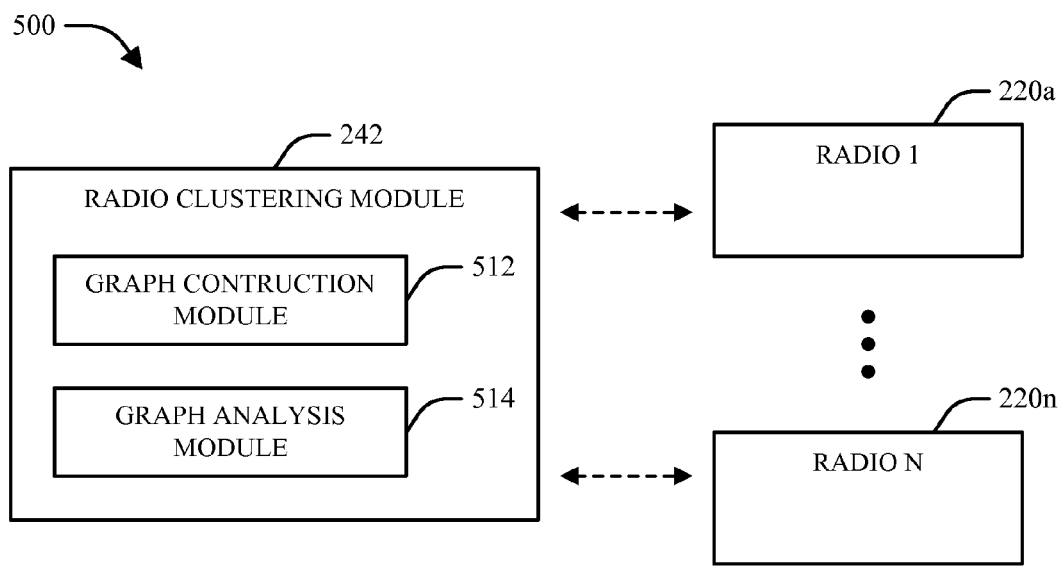
FIG. 5 is a block diagram of a system for constructing and utilizing a radio graph in connection with filtering a set of radios in accordance with various aspects.

Turning next to FIG. 5, a system 500 is provided that illustrates an example graphical algorithm that can be utilized by radio clustering module 242. As noted above with respect to system 400, the objective of radio clustering module 242 can be to determine respective clusters of transceivers or radios 220 whose decisions impact each other. In accordance with one aspect, radio clustering module 242 can accomplish this and/or other related objectives by representing respective transceivers or radios 220 on a graph (e.g., using a graph construction module 512 or the like). In one example, such a graph can be constructed by representing respective transceivers with nodes and connecting nodes corresponding to respective transceivers with edges if the transceivers are potentially conflicting as described above. As used herein, such a graph is referred to as a "radio graph" or a "transceiver graph."

Figure 6:
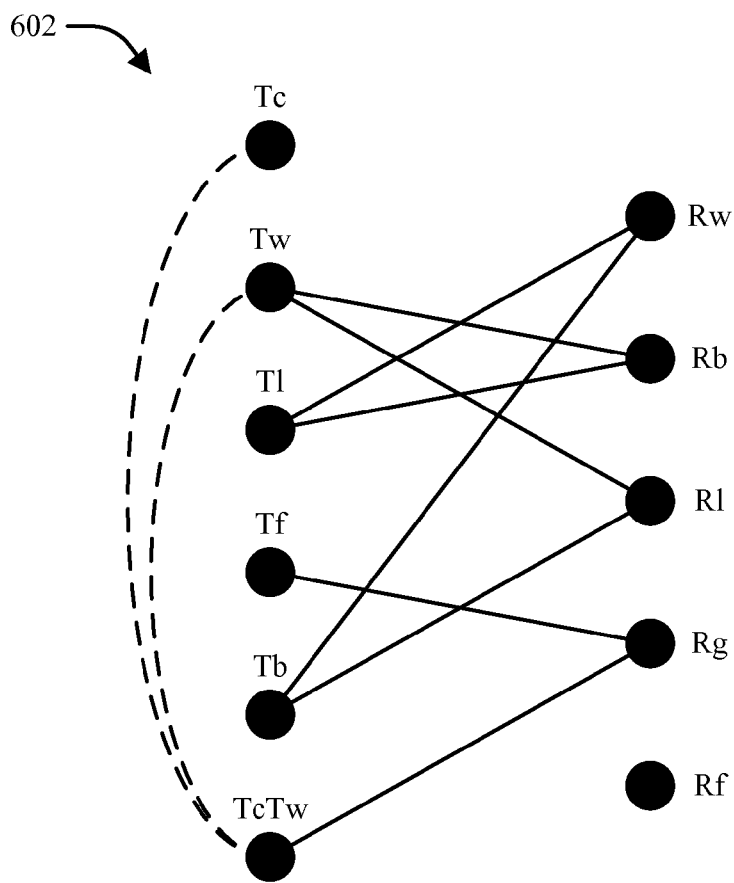
FIG. 6 illustrates respective radio graphs that can be constructed and analyzed in accordance with various aspects.
Figure 6:
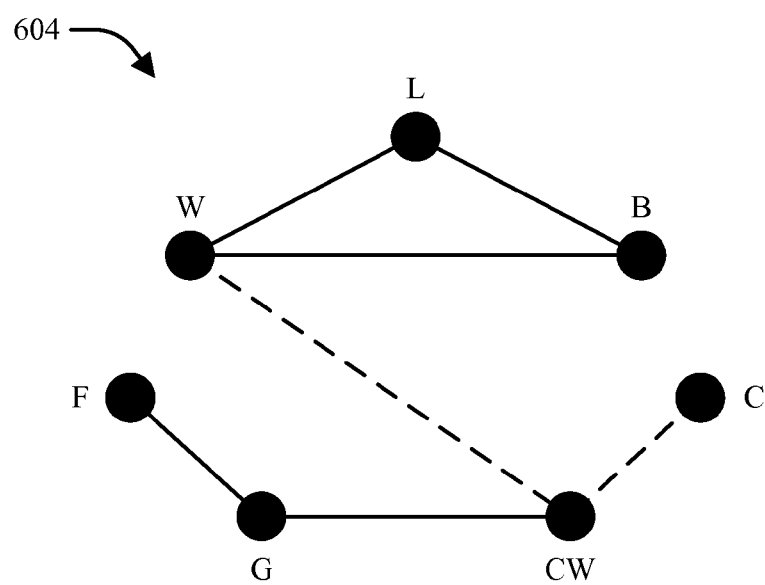

Respective examples of graphs 602-604 that can be generated by graph construction module 512 are illustrated by FIG. 6. For example, graph 602 illustrates potential pairwise collisions between a CDMA radio transmitter (Tc), a WLAN radio transceiver (with transmitter component Tw and receiver component Rw, respectively), an LTE radio transceiver (with transmitter component Tl and receiver component Rl, respectively), a frequency modulation (FM) radio transceiver (with transmitter component Tf and receiver component Rf, respectively), a BT radio transceiver (with transmitter component Tb and receiver component Rb, respectively), and a GPS radio receiver (Rg). As further shown on graph 602, a three radio mechanism between transceiver components Tc, Tw, and Rg is represented as a combination node TcTw that is joined to Rg. In a further example, a combination node can additionally be connected via edges to its respective constituent nodes. Thus, as shown on graph 602, node TcTw is connected to nodes Tc and Tw using dashed edges.

Additionally or alternatively, graph 604 illustrates potential pairwise collisions between the CDMA, WLAN, LTE, FM, BT, and GPS radio transceivers (identified on graph 604 as C, W, L, F, B, and G, respectively) without dividing the respective transceivers into their respective transmitter and receiver components. In a similar manner to graph 602, a combination node CW is generated to represent a three radio mechanism between CDMA, WLAN, and GPS.

In accordance with one aspect, graph construction module 512 in system 500 can construct one or more graphs with transmitter/receiver distinctions as shown by graph 602, or without such distinctions as shown by graph 604, based on a type of analysis to be performed on the graph (e.g., by a graph analysis module 514). For example, in the event that radio clustering module 242 is desired to produce clusters in the data plane or the control plane for the purpose of radio resolution (e.g., "resolution clusters"), a graph such as that shown by graph 602 can be utilized. Additionally or alternatively, in the event that radio clustering module 242 is desired to produce clusters in the control plane for the purpose of CxM sleep control (e.g., "sleep clusters"), a graph such as that shown by graph 604 can be utilized. It can be appreciated that such a distinction between cluster types can be based on respective requirements of their underlying operations. For example, radio resolution can in some cases require distinction between transmitter and receiver components of a given transceiver, while sleep control can in some cases be configured to operate without distinguishing between transmitter and receiver components of respective transceivers. This distinction is based on the fact that, in terms of sleep control, a transceiver that is asleep will be asleep in terms of both transmission and reception, meaning that an associated CxM cannot enter sleep based on particular transceiver components that are asleep.

In accordance with another aspect, based on a radio or transceiver graph as constructed by graph construction module 512, a graph analysis module 514 at radio clustering module 242 can divide respective radios 220 or transceivers into clusters such that respective transceivers are associated with only a single cluster and that respective transceivers in a given cluster do not exhibit potential collisions with transceivers in other clusters. While, as noted above, a graph can be formed by connecting radios or transceivers that impact each other directly, radio clustering module 242 can be required to find substantially all transceivers whose decisions impact each other. For example, as described earlier, in the case that there are edges between T1R3 and T2R3, a joint decision can in some cases be needed because T1 and T2 are indirectly connected via R3. More generally, it can be appreciated that two transceivers belong to the same cluster if there is a path connecting them in the radio graph. Thus, based on a radio or transceiver graph, graph analysis 514 can determine respective clusters by finding the maximal set of transceivers where every pair of transceivers has a path connecting them. In graph theory terminology, a set of nodes where every pair of nodes has a connecting path is called a connected component or a connected subgraph. Thus, in one example, graph analysis module 514 can determine respective clusters of radios 220 by finding the maximal connected subgraphs of the graph generated by graph construction module 510.

In one example, graph analysis module 512 can start from a given node in a corresponding graph to form a cluster and iteratively accumulate nodes that are connected to the cluster.

By way of specific example, an algorithm that can be utilized by graph analysis module 514 to determine clusters can be implemented as follows. Initially, all transceivers or radios 220 to be considered can be placed in the universal set Ω. The algorithm may be performed iteratively, such that a first iteration is used to determine all potential clusters that include an initial building branch (BB) in the graph, and one or more additional iterations can be performed to determine remaining potential clusters.

In the first iteration, the universal set Ω can be split into a primary set (PS) and a secondary set (SS). The primary set can include two connected nodes denoted as a building branch, and the secondary set can initially include the remaining nodes in the universal set Ω. A branch corresponding to any two connected nodes can be selected as the building branch. Alternatively, the primary set can initially contain the null set and the secondary set can initially contain all nodes in Ω, and a building branch can be chosen and moved to the primary set as a first operation.

Subsequently, if the secondary set has conflicting nodes, the secondary set can be split into K different subsets, e.g., SS1, SS2, . . . , SSK, where K can be any suitable integer value. As used herein, "conflicting nodes" refers to any nodes that cannot be present simultaneously. For example, it can be appreciated that a transmitter and a receiver for a time division duplex (TDD) system cannot both be active simultaneously, as a wireless device can only transmit or receive at any given moment in a TDD system. In one example, the number of subsets to form, as well as the nodes in each subset, can be dependent on which nodes in the secondary set are conflicting. Further, it can be appreciated that each subset SSk can result in one or more clusters being formed.

Next, for a given subset SSk, a cluster Ck can be defined to initially include the nodes in the primary set, and the nodes in subset SSk that connect to the nodes in cluster Ck can be moved from subset SSk to cluster Ck. In one example, graph analysis module 514 can use a collision graph to identify nodes in subset SSk that can be moved. Further, upon a node in subset SSk being moved to cluster Ck, the connectivity of the remaining nodes in subset SSk with the nodes in cluster Ck can be rechecked by graph analysis module 514 to determine whether another node in subset SSk can be moved to cluster Ck. After moving all connected nodes in subset SSk to cluster Ck, it can be appreciated that cluster Ck represents the first cluster formed with subset SSk. If no nodes in subset SSk are connected to the nodes in the building branch, then it can be appreciated that the nodes in the building branch form a cluster by themselves. The updated subset SSk can be processed again in a subsequent iteration.

In one example, the process described above for subset SSk can be repeated for each of subsets SS1 through SSK. For subset SSk, a cluster Ck can initially include the nodes in the primary set and can be updated to include the nodes in subset SSk that connect to the nodes in cluster Ck. In accordance with one aspect, K clusters can be formed corresponding to K subsets SS1 through SSK and can respectively represent K connected graphs, with each connected graph including nodes that are connected together.

For the second iteration, the process described above for the first iteration can be repeated. More particularly, for each subset SSk, a cluster Ckb can be defined to initially include two nodes of a building branch in subset SSk. It can be appreciated that this building branch is not necessarily a subset of cluster Ck already formed for subset SSk. Next, the nodes in subset SSk that connect to the nodes in cluster Ckb can be moved from subset SSk to cluster Ckb. If subset SSk includes a single node, then cluster Ckb can include that single node, and subset SSk can be emptied. After moving substantially all connected nodes in subset SSk to cluster Ckb, cluster Ckb can represent the second cluster formed with subset SSk. This processing can be repeated for each of subsets SS1 through SSK.

In accordance with one aspect, respective iterations can generate new clusters for respective subsets SSk. The new cluster(s) can initially include a building branch that has not appeared in the cluster(s) already formed, and a number of iterations can be performed to form all clusters for each subset SSk.

The algorithm described above can determine respective clusters that can be formed with respective transceivers associated with a universal set Ω. In each decision period, a given set of transceivers may be active, and this set of active transceivers can be a subset of all transceivers. There may be certain restrictions on which transceivers cannot be active at the same time, which can correspond to the conflicting nodes described above. In one example, clusters may be dynamically determined in each decision period by radio clustering module 242 based on the active transceivers in that decision period. The active transceivers can be, for example, transceivers that are scheduled to operate concurrently in an upcoming time period and are to be evaluated for potential conflict.

In general, the above algorithm can be summarized as follows. Initially, a PS corresponding to a set of nodes in a transceiver graph can be set to the null set Ø, while a SS can be set to the universal set Ω of all nodes in the transceiver graph. Next, any node in the SS is selected and moved to the PS. Next, based on the radio graph, a node is moved from the SS to the PS if it is connected to any node in the PS. This step is then repeated until no node in the SS is connected to any node in the PS, at which time the PS is reported as a cluster. Subsequently, the PS can be reset to the null set Ø and the above operations can be repeated to find additional clusters until exhaustion of the SS.

The above algorithm can be illustrated through an example shown in Table 1 below, which utilizes a subgraph of graph 602 formed by assuming that the transmit and receive events of a TDD radio are not active simultaneously. In accordance with one aspect, this assumption can generally be made for events on the time scale of the data plane. However, it should be appreciated that this assumption may in some cases not apply, since the event horizon in a particular DU could involve both transmit and receive events from a TDD radio. For the procedure shown in Table 1, the clustering algorithm starts with TcTw as the first node of the primary set, which is connected to Tc and Tw. Accordingly, Rw is not considered in the procedure as it is assumed not to be active concurrently with Tw. Further, Tb is not considered in the procedure as it is assumed not to be active concurrently with Rb. At the end of the initial step of the algorithm as described above, it can be appreciated that a first cluster is formed with all radios except Rf. Upon iteration, it can be appreciated that Rf can be identified as a separate cluster by itself.

TABLE 1

Operation of example radio clustering algorithm.
Beginning with (TcTw, Rg) as a building branch

| PS | SS |
|---|---|
| {Tc, Tw, Rg} | {Tl, Tf, Rb, Rl, Rf} |
| {Tc, Tw, Rg, Tf} | {Tl, Rb, Rl, Rf} |
| {Tc, Tw, Rg, Tf, Rb} | {Tl, Rl, Rf} |
| {Tc, Tw, Rg, Tf, Rb, Tl} | {Rl, Rf} |
| {Tc, Tw, Rg, Tf, Rb, Tl, Rl} | {Rf} |

Cluster 1 = {Tc, Tw, Rg, Tf, Rb, Tl, Rl}
Cluster 2 = {Rf}

Additionally or alternatively, an example of radio clustering which can be performed to account for transmitter and receiver components of a TDD transceiver by utilizing multiple secondary sets as generally described above is illustrated by Table 2 below. The procedure illustrated by Table 2 below initially utilizes TcTw as the first node in the building branch in a similar manner to that shown by Table 1, and multiple secondary sets (e.g., SS1 and SS2) are constructed to consider both Tb and Rb. Next, Tl is selected as the first node in a second building branch such that consideration can be given for both Tw and Rw (e.g., via secondary sets SS3 and SS4). Upon conclusion of all iterations, four sets of clusters are returned.

TABLE 2

Operation of example radio clustering algorithm - multiple secondary sets.

Beginning with {TcTw, Rg} as a building branch

| | |
|---|---|
| PS = {Tc, Tw, Rg} | SS = {Tl, Tf, Tb, Rb, Rl, Rf} |
| PS = {Tc, Tw, Rg} | SS1 = {Tl, Tf, Rb, Rl, Rf} |
| | SS2 = {Tl, Tf, Tb, Rl, Rf} |

For SS1:

| | |
|---|---|
| C1 = {Tc, Tw, Rg} | SS1 = {Tl, Tf, Rb, Rl, Rf} |
| C1 = {Tc, Tw, Rg, Tf} | SS1 = {Tl, Rb, Rl, Rf} |
| C1 = {Tc, Tw, Rg, Tf, Rb} | SS1 = {Tl, Rl, Rf} |
| C1 = {Tc, Tw, Rg, Tf, Rb, Tl} | SS1 = {Rl, Rf} |
| C1 = {Tc, Tw, Rg, Tf, Rb, Tl, Rl} | SS1 = {Rf} |

For SS2:

| | |
|---|---|
| C2 = {Tc, Tw, Rg} | SS2 = {Tl, Tf, Tb, Rl, Rf} |
| C2 = {Tc, Tw, Rg, Tf} | SS2 = {Tl, Tb, Rl, Rf} |
| C2 = {Tc, Tw, Rg, Tf, Rl} | SS2 = {Tl, Tb, Rf} |
| C2 = {Tc, Tw, Rg, Tf, Rl, Tb} | SS2 = {Tl, Rf} |

Beginning with (Tl, Rw) as a building branch

| | |
|---|---|
| PS = {Tl, Rw} | SS = {Tc, Tf, Tb, Rb, Rl, Rg, Rf} |
| PS = {Tl, Rw} | SS3 = {Tc, Tf, Tb, Rl, Rg, Rf} |
| | SS4 = {Tc, Tf, Rb, Rl, Rg, Rf} |

For SS3:

| | |
|---|---|
| C3 = {Tl, Rw} | SS3 = {Tc, Tf, Tb, Rl, Rg, Rf} |
| C3 = {Tl, Rw, Tb} | SS3 = {Tc, Tf, Rl, Rg, Rf} |
| C3 = {Tl, Rw, Tb, Rl} | SS3 = {Tc, Tf, Rg, Rf} |

For SS4:

| | |
|---|---|
| C4 = {Tl, Rw} | SS4 = {Tc, Tf, Rb, Rl, Rg, Rf} |
| C4 = {Tl, Rw, Rb} | SS4 = {Tc, Tf, Rl, Rg, Rf} |

While Tables 1-2 illustrate examples in which sets of two clusters are formed for a set of active radios, it should be appreciated that any number of clusters can be formed, and the number of clusters that can be formed can be dependent on the collision graph as well as the active radios.

In accordance with one aspect, radio clustering module 242 can perform clustering dynamically (e.g., within each DU). For example, graph construction module 512 can construct a collision graph for the set of active transceivers based on information relating to pairs of transceivers that collide. In one example, such information can be available for respective radios 220 and/or other transceivers and can be stored in a database or other suitable mechanisms. In general, respective generated cluster can include nodes that are interconnected, and transceivers corresponding to these nodes can in some cases collide require resolution. A resolution for a cluster can, for example, indicate changes to one or more parameters of one or more transceivers in the cluster to enable all of the transceivers in the cluster to operate concurrently. A change for a parameter can include a change to frequency, transmit power, etc.

In some instances, a resolution for all radios or transceivers in a cluster may not be available or may be unacceptable, e.g., due to poor performance. However, in the event that respective resolutions are available for one or more subsets of transceivers in the cluster, the one or more subsets can operate by applying the resolution(s) for the respective subsets.

In general, it can be appreciated that the above techniques could be utilized to determine resolution clusters for respective transceivers, as distinctions are maintained between transmitter and receiver components of respective transceivers. Alternatively, sleep clusters could be generated in a similar manner by regarding transmitter and receiver components of a given radio as a single entity.

In accordance with one aspect, resolution clusters generated by radio clustering module 242 can be dynamic, as the set of transceivers that are active over the timescale of the data plane or control plane can be variable. In one example, resolution clusters in the data plane can be used for short term resolutions (e.g., TDM schemes or power backoff based resolutions), while resolution clusters on the control plane can be used for longer-term resolutions (e.g., sub-band resolutions). As the event horizon is larger in the control plane, it can be appreciated that the number of transceivers considered by radio clustering module 242 can be larger; for example, both transmitter and receiver components of a TDD radio may need to be considered in the control plane while they may not be simultaneously active in the data plane.

Figure 7:
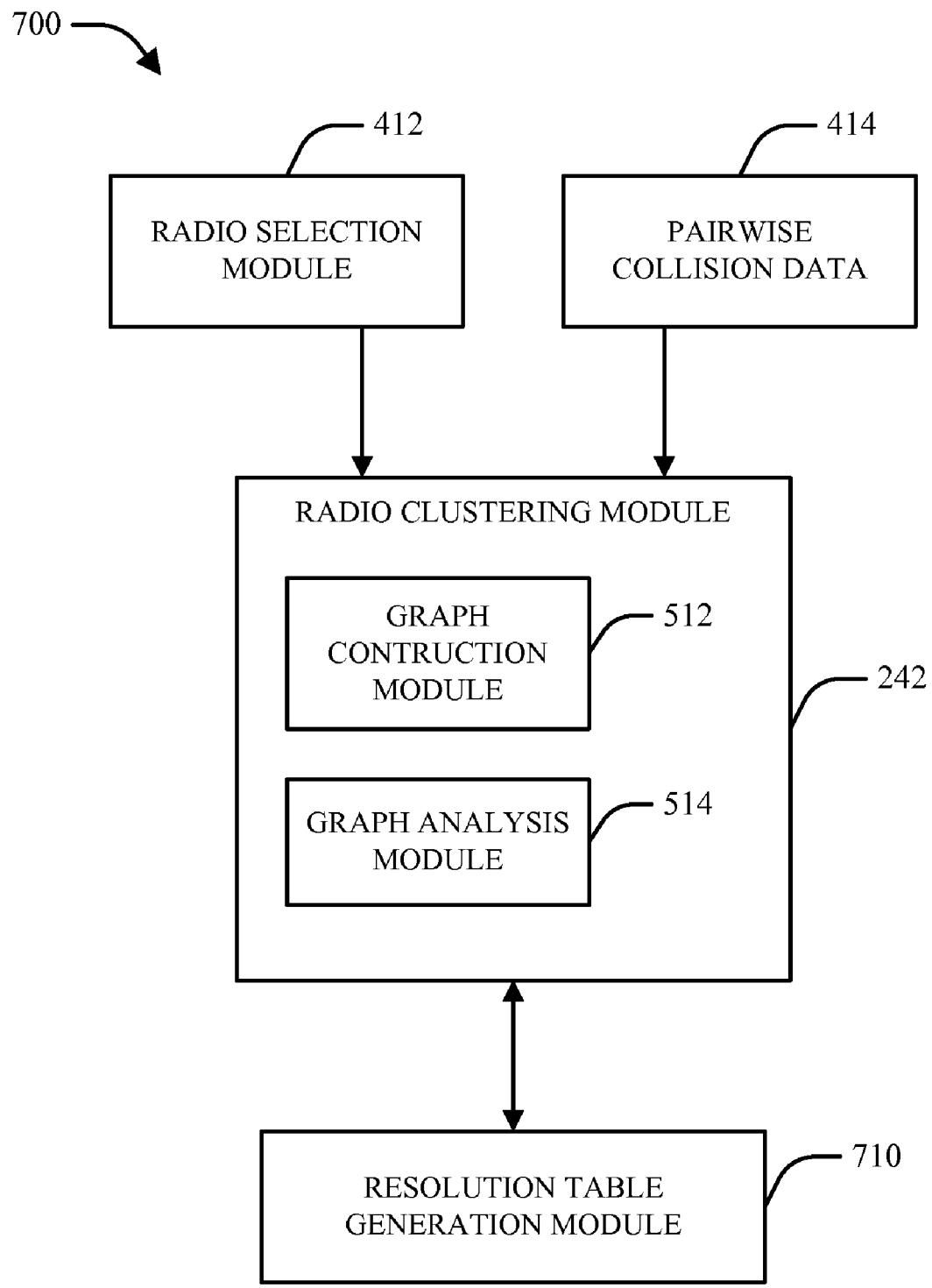
FIG. 7 is a block diagram of a system for generating a resolution table for a given radio combination in accordance with various aspects.

In some cases, it may not be necessary to run the clustering algorithm in every DU. For example, radio clustering module 242 can check if the combination of radios has changed in a given DU and run the clustering algorithm only when it has indeed changed. More generally, radio clustering module 242 can keep track of frequently occurring radio combinations (e.g., even if not in consecutive DUs) and store the computed clusters. Subsequently, radio clustering module 242 can check to see if the combination for a particular DU is in the frequently occurring combinations and, if so, utilize the stored clusters and avoid repeat computation. This can be particularly applicable in the case of TDD radios, where the transmit and receive components of a given can radio appear repeatedly in different DUs Turning next to FIG. 7, a block diagram of a system 700 for generating a resolution table (RT) for a given radio combination in accordance with various aspects is illustrated. As shown in FIG. 7, system 700 can include a radio clustering module 242, which can generate a cluster for a determined set of transceivers identified by a radio selection module 412 based on pairwise collision data 414 (e.g., based on a graphical approach via graph construction module 512 and graph analysis module 514). Subsequently, a resolution table generation module 710 can be utilized to generate one or more RTs for the transceivers identified by radio selection module 412 based on clusters identified by radio clustering module 242.

In accordance with one aspect, a given cluster can be broken down to determine respective combinations of connected nodes. Subsequently, a resolution can be determined for each combination of connected nodes and can be stored in a RT or the like. In one example, a RT can store resolutions for respective combinations of colliding radios for which resolutions are available and can be utilized to determine which transceivers to dispatch or enable in a given decision period.

In one example, all possible clusters of nodes in a collision graph can be used by resolution table generation module 710 to build a RT. For example, respective clusters can be broken down to obtain different combinations of colliding transceivers. For clarity, the process of breaking down a cluster is described below in conjunction with an example resolution table generated for graph 300 in FIG. 3. As described above, node TcTw in graph 300 corresponds to a case in which both Tc and Tw are active. While not illustrated in graph 300, node TcTw is regarded in the following example to be associated with the mechanisms TcTwRb and TcTwRl due to the fact that Tw potentially conflicts with both Rb and Rl.

For a given cluster, resolution table generation module 710 can define a second order set to include all pairs of nodes corresponding to a branch in a connected graph corresponding to a given cluster. Thus, for cluster C1={Tc, Tw, Rg, Tf, Rb, Tl, Rl} as given by Table 2 above, the second order set can include five pairs of nodes for the five branches shown by solid lines in graph 300 and can be denoted as S2=(Tw-Rb, Tw-Rl, Tl-Rb, Tf-Rg, TcTw-Rg). Similarly, a third order set can be obtained by taking each pair in the second order set and adding one connected node (if any) to each pair. For example, pair Tw-Rb is connected to node Tl, to node Rl, and to TcTw-Rg in graph 300. Accordingly, three triplets can then be formed and denoted as Tw-Rb-Tl, Tw-Rb-Rl, and TcTw-Rb-Rg. Based on this, the 3rd order set can be denoted as S3= (Tw-Tl-Rb, Tw-Rb-Rl, TcTw-Tf-Rg, TcTw-Rb-Rg, TcTw-Rg-Rl).

Next, a fourth order set can be obtained by taking each triplet in the third order set and adding one connected node (if any) to the respective triplets. In the example of graph 300, the fourth order set can include five quadruplets and can be denoted as S4=(Tw-Tl-Rb-Rl, TcTw-Tf-Rg-Rl, TcTw-Tf-Rg-Rb, TcTw-Rb-Rg-Rl, TcTw-Tl-Rb-Rg). By continuing the above procedure for a fifth order set and a sixth order set, a fifth order set S5=(TcTw-Tl-Rb-Rg-Rl, TcTw-Tf-Tl-Rb-Rg) and a sixth order set S6=(TcTw-Tl-Tf-Rb-Rg-Rl) can further be obtained.

Overall, it can be appreciated that 18 valid combinations of transceivers are obtained by resolution table generation module 710 in the second through sixth order sets for cluster C1. This is substantially fewer than the 128 potential combinations of radios that would be formed based on all possible combinations of the seven radios in cluster C1. In one example, this reduction in the number of valid combinations is achieved by discarding combinations of transceivers that do not collide and retaining only combinations of transceivers that collide. Accordingly, a RT generated by resolution table generation module 710 can include resolutions for the 18 valid combinations of transceivers in cluster C1.

In general, resolution table generation module 710 can determine various combinations of nodes of each cluster to include in an associated RT by finding a set of maximal connected subgraphs or components of a connected graph when removing some of the nodes. For example, for a given cluster defined by an n-th order connected graph, one node may be removed from the connected graph at a time, and all combinations of (n−1) connected nodes, if any, can be identified. Next, one pair of nodes can be removed from the connected graph at a time, and all combinations of (n−2) connected nodes, if any, can be identified. This process can be repeated until pairs of connected nodes are identified. Subsequently, the building set for an associated RT can be formed by the union of all combinations of connected nodes for the cluster. In one example, this process can be repeated for each possible cluster that can be formed for all transceivers. Resolutions can be determined for all combinations of transceivers of interest and stored in the RT.

In accordance with one aspect, there can in some cases be redundancy in breaking down all possible clusters. By way of example, some of the valid transceiver combinations for cluster C2=(Tc, Tw, Tb, Tf, Rg, Rl) could also be valid transceiver combinations for cluster C1=(Tc, Tw, Tf, Tl, Rg, Rb, Rl). Thus, to reduce the redundancy in breaking down a given cluster Cx, the intersection of cluster Cx with previously broken down clusters can be determined, such that only elements in the difference between cluster Cx and the previously broken down clusters are analyzed.

In accordance with another aspect, a given cluster Cy can be broken down into multiple subclusters, such that each subcluster can include a different subset or combination of the transceivers in cluster Cy. For example, cluster Cy can include three radios T1, R2, and R3 and can be broken down into three subclusters T1-R2, T1-R3, and R2-R3. In general, cluster Cy can be broken down based on (i) respective techniques as described above to obtain valid subclusters or (ii) brute force to obtain all possible subclusters. The priority of each subcluster can be determined, for example, based on the priorities of the transceivers in the subcluster, such that the subcluster with the highest priority and/or any other suitable subcluster can be selected. In one example, the resolution for a selected subcluster can be obtained from an associated RT and applied.

Figure 8:
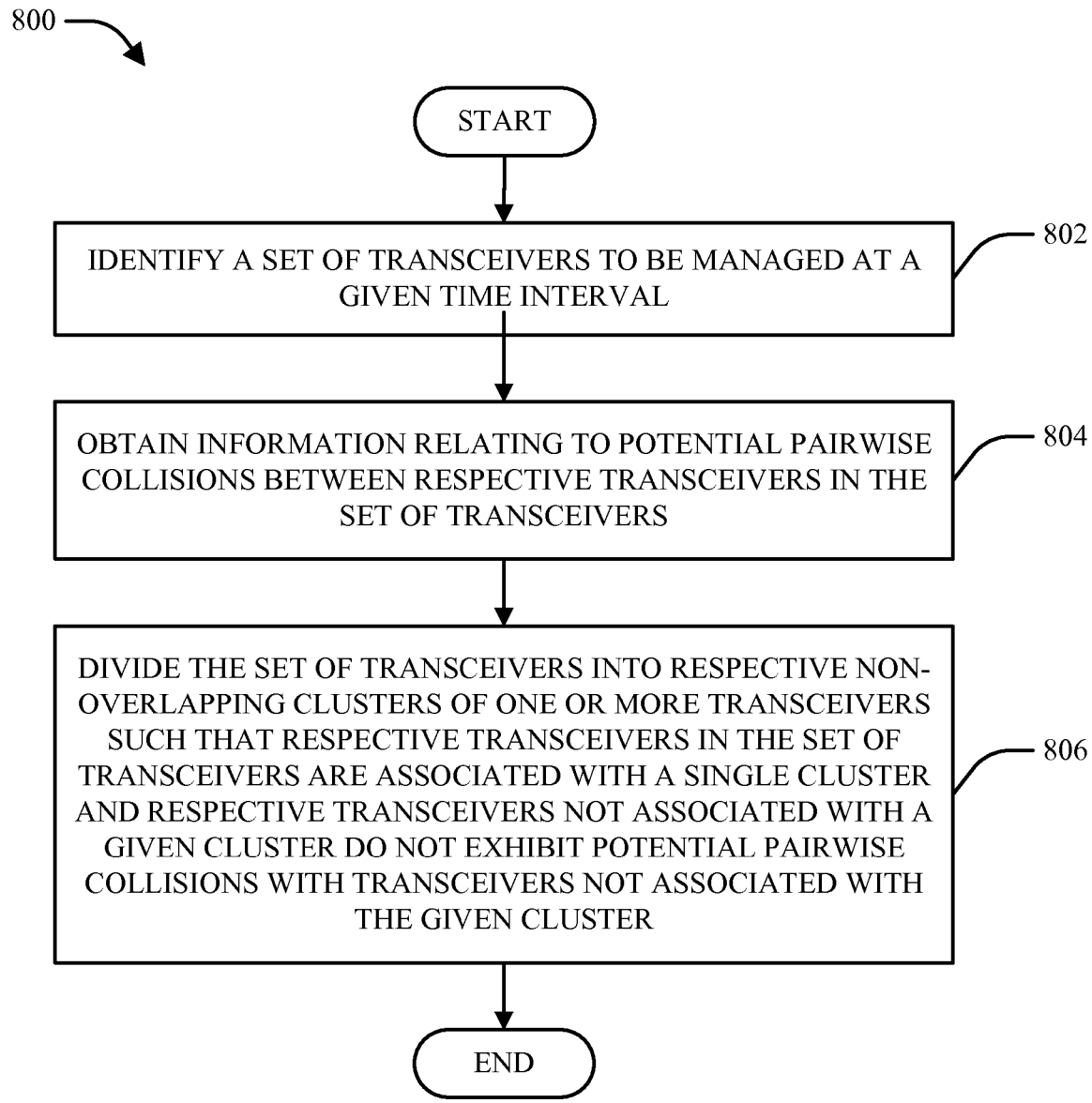
FIGS. 8-9 are flow diagrams of respective methodologies for filtering a set of transceivers associated with a communication environment into respective clusters.
Figure 9:
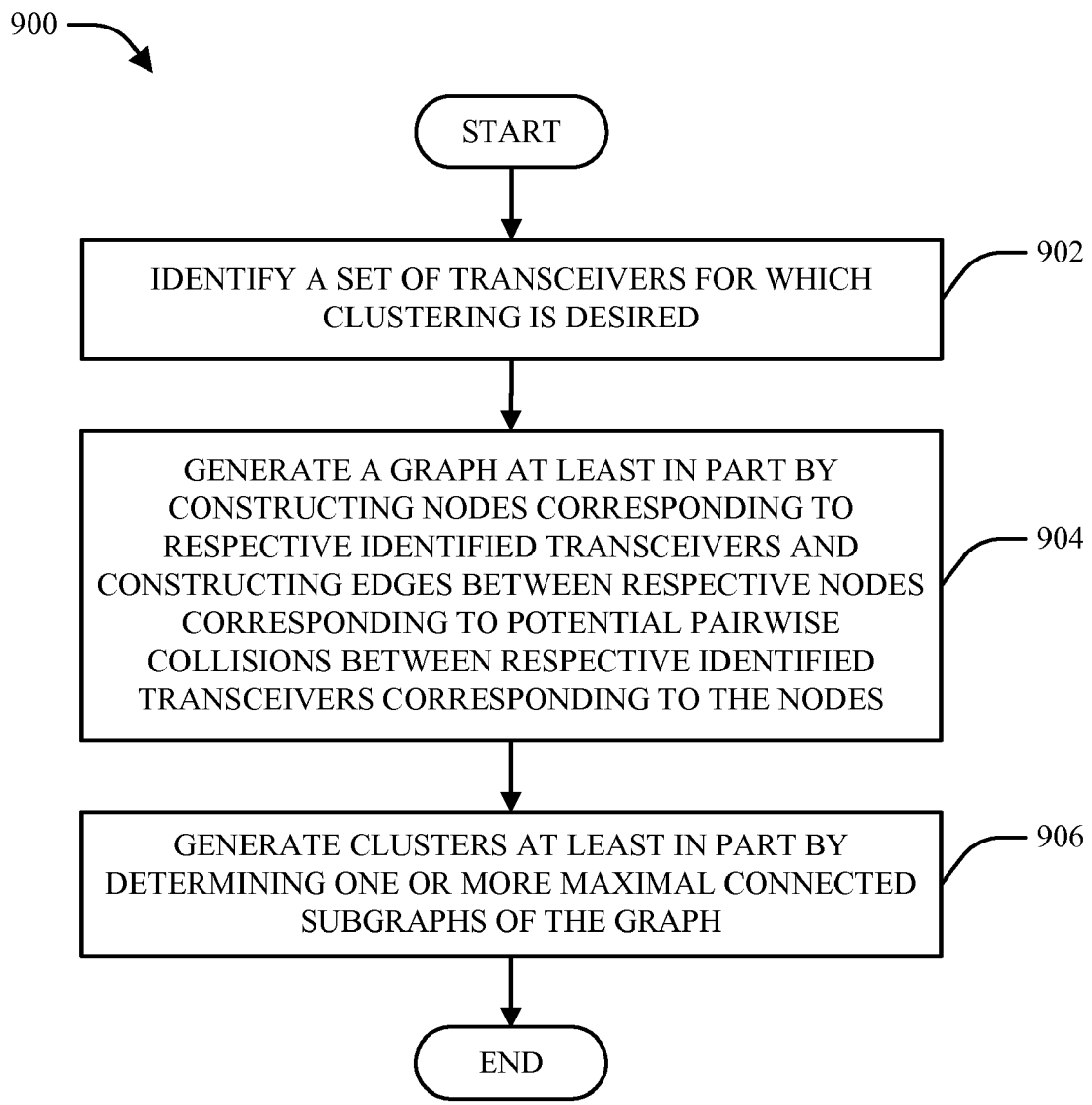
Figure 10:
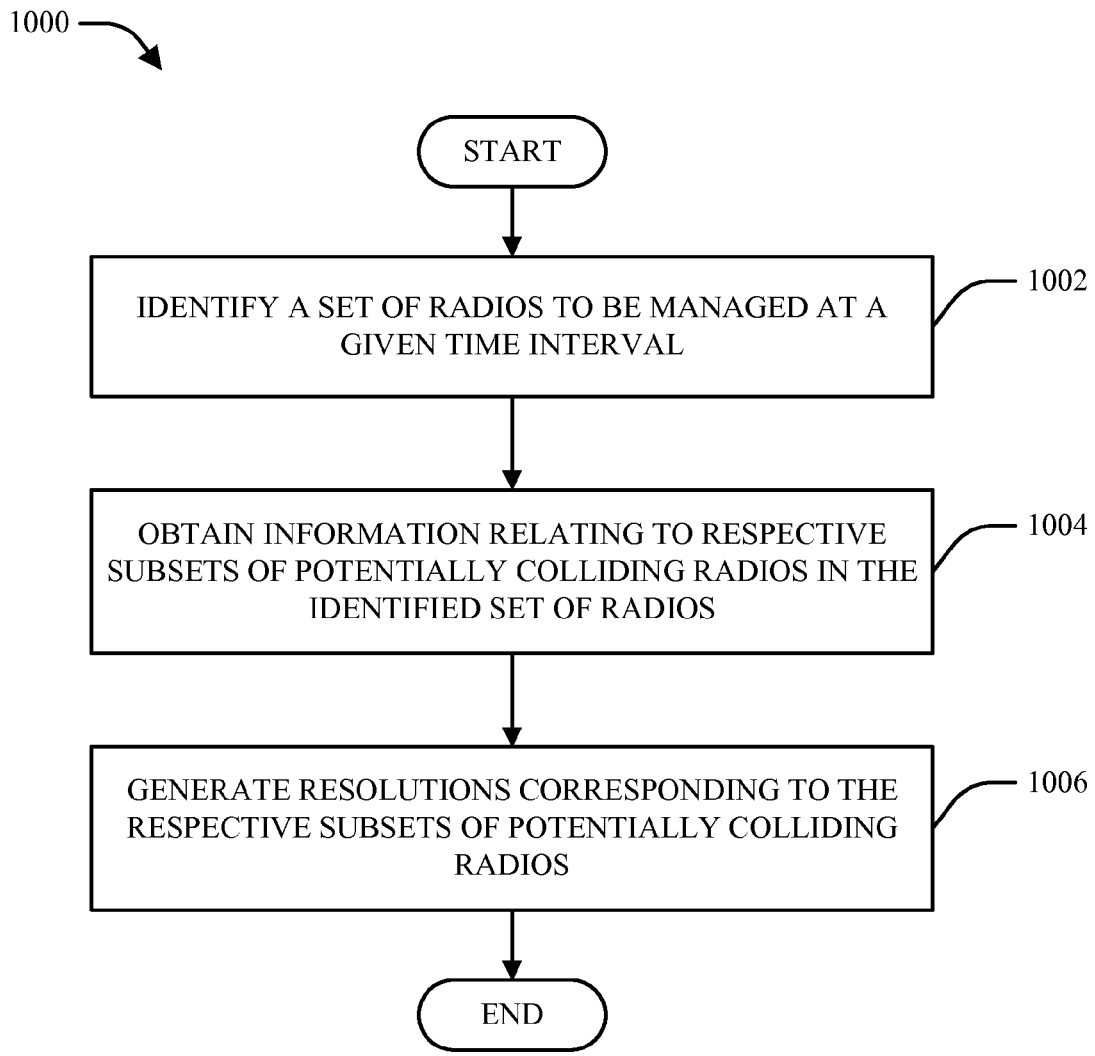
FIG. 10 is a flow diagram of a methodology for constructing respective resolution tables for a set of radios associated with a multi-radio wireless device.

Referring now to FIGS. 8-10, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 8, illustrated is a methodology 800 for filtering a set of transceivers associated with a communication environment into respective clusters. It is to be appreciated that methodology 800 can be performed by, for example, a wireless device (e.g., wireless device 110 or 200, via a CxM 240) and/or any other appropriate network device. Methodology 800 can begin at block 802, wherein a set of transceivers to be managed at a given time interval is identified. Next, at block 804, information is obtained that relates to potential pairwise collisions between respective transceivers in the set of transceivers identified at block 802. Methodology 800 can then conclude at block 806, wherein the set of transceivers identified at block 802 is divided into respective non-overlapping clusters of one or more transceivers such that respective transceivers in the set of transceivers are associated with a single cluster and respective transceivers not associated with a given cluster do not exhibit potential pairwise collisions with transceivers not associated with the given cluster (e.g., according to the information obtained at block 804).

FIG. 9 illustrates another methodology 900 for filtering a set of transceivers associated with a communication environment into respective clusters. Methodology 900 can be performed by, for example, a wireless terminal and/or any other suitable network entity. Methodology 900 begins at block 902, wherein a set of transceivers for which clustering is desired is identified. Next, at block 904, a graph is generated at least in part by constructing nodes corresponding to respective transceivers identified at block 902 and constructing edges between respective nodes corresponding to potential pairwise collisions between respective identified transceivers corresponding to the nodes. Finally, at block 906, clusters of transceivers are generated at least in part by determining one or more maximal connected subgraphs of the graph generated at block 904.

Turning next to FIG. 10, a methodology 1000 for constructing respective resolution tables for a set of radios associated with a multi-radio wireless device is illustrated. Methodology 1000 can be performed by, for example, a multi-radio wireless device and/or any other suitable wireless network entity. Methodology 1000 can begin at block 1002, wherein a set of radios to be managed at a given time interval is identified. Next, at block 1004, information relating to respective subsets of potentially colliding radios in the set of radios identified at block 1002 is obtained. Methodology 1000 can then conclude at block 1006, wherein resolutions are generated that correspond to the respective subsets of potentially colliding radios for which information is obtained at block 1004.

Figure 11:
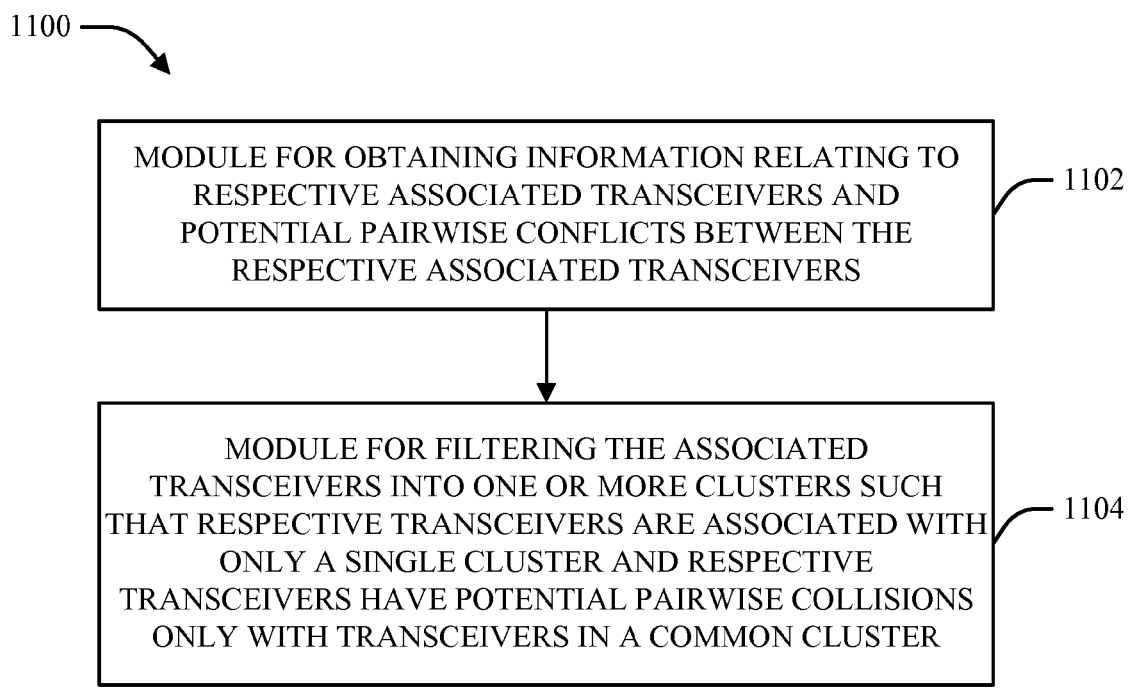
FIG. 11 is a block diagram of an apparatus that facilitates radio clustering in a communication system.

Turning now to FIG. 11, an apparatus 1100 that facilitates radio and/or transceiver clustering in a communication system is illustrated. It is to be appreciated that apparatus 1100 is represented as including functional blocks, which can be functional blocks that represent functions implemented by a processor, software, or combination thereof (e.g., firmware). Apparatus 1100 can be implemented by a wireless device (e.g., wireless device 110 or 200) and/or another suitable network entity and can include a module 1102 for obtaining information relating to respective associated transceivers and potential pairwise conflicts between the respective associated transceivers and a module 1104 for filtering the associated transceivers into one or more clusters such that respective transceivers are associated with only a single cluster and respective transceivers have potential pairwise collisions only with transceivers in a common cluster.

Figure 12:
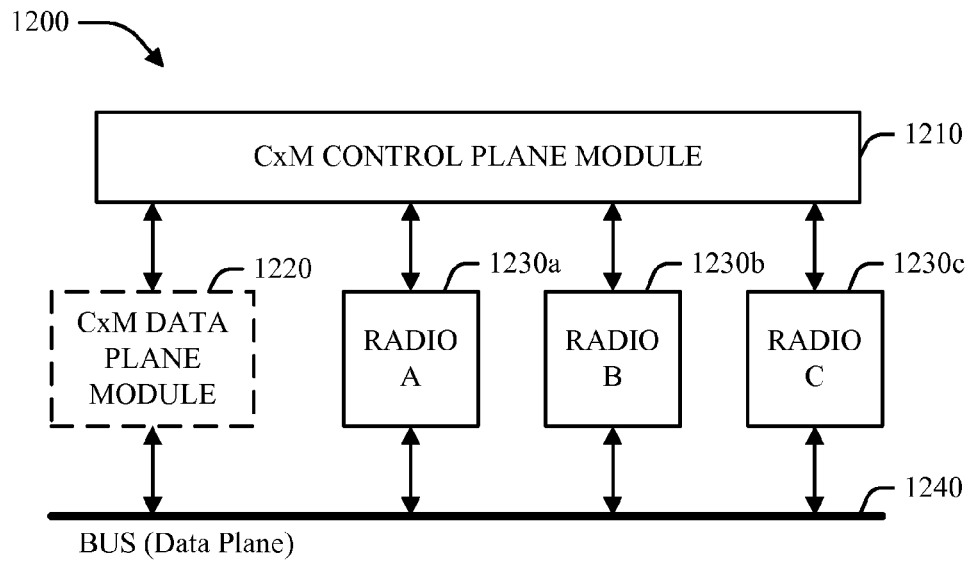
FIGS. 12-14 illustrate various aspects of a radio coexistence architecture that can be utilized to implement various aspects described herein.

Turning next to FIG. 12, an example implementation of a system 1200 that can be utilized to implement various aspects described herein is illustrated. In one example, if multiple radios and/or other transceivers that can potentially interfere with each other are utilized in a communication system, system 1600 can be used to coordinate the respective radios/transceivers. In one example, system 1200 can be implemented as a mixture of software and hardware by utilizing, for example, a CxM control plane module 1210 and an optional CxM data plane module 1220.

In accordance with one aspect, system 1200 can be implemented as a centralized architecture such that respective radios 1230a-1230c can coordinate and/or send notifications to CxM data plane module 1220, which can in turn send responses back to respective radios 1230a-1230c. Alternatively, a decentralized architecture can be utilized in which radios 1230a-1230c interact with CxM control plane module 1210 directly. In another example, operation of system 1600 can be split into hardware and software to accommodate time scales associated with coexistence issues. For example, radios 1630a-1630c can provide notifications of an imminent radio event at a substantially fast time scale (e.g., on the order of 100-150 microseconds), and accordingly CxM data plane module 1220 and/or a data plane bus 1240 between CxM data plane module 1220 and radios 1230a-1230c can be utilized to accommodate expedient operation based on notifications. Additionally or alternatively, CxM control plane module 1210 can be implemented in the control plane to facilitate operations that can occur on a slower time scale, such as coordination radios coming on or off, sleep mode operation, or the like.

Figure 13:
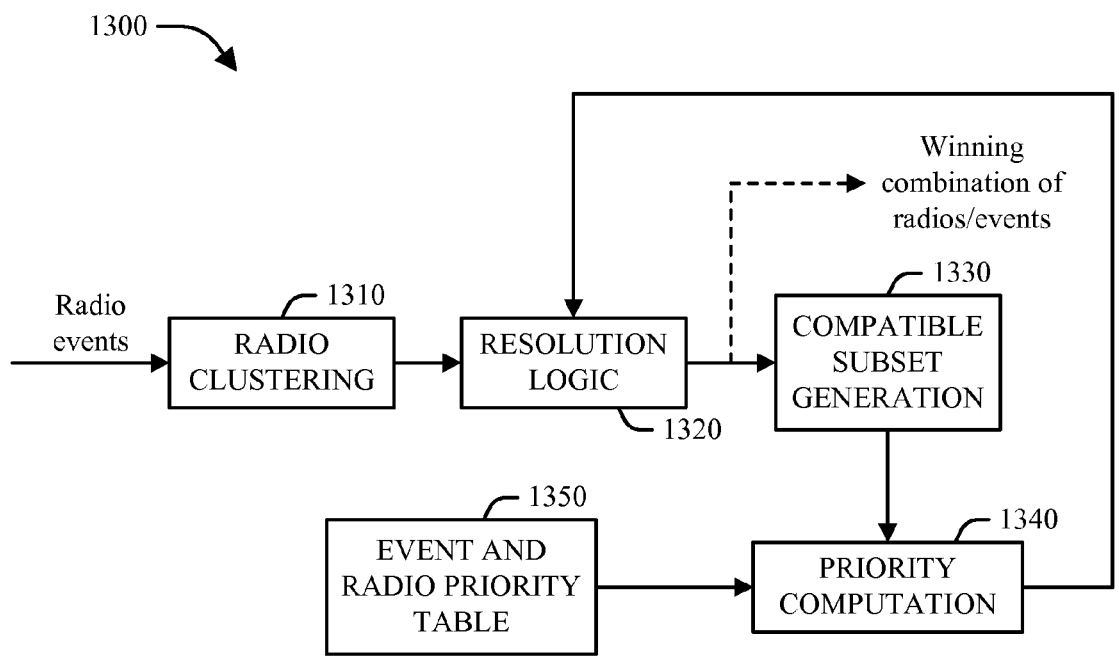

Referring now to system 1300 in FIG. 13, an example data plane CxM implementation is illustrated. As shown in system 1300, received radio events in a given DU are first passed by a filtering process through a radio clustering block 1310, which can operate as described herein to divide the radio events into respective clusters such that events in the same cluster can potentially collide while those in different clusters do not collide. Based on radio clusters generated by radio clustering block 1310, one or more following operations in system 1300 can be performed per cluster. In one example, piecewise collisions between respective radios can be provided as input to radio clustering block 1310.

Next, a set of dynamic radio clusters generated by radio clustering block 1310 can be passed to a resolution logic block 1320, which can attempt to find a solution for coexistence within the respective clusters. In the event that a coexistence solution can be found for a given cluster, operation of system 1300 can complete for that cluster. However, in the event that a coexistence solution is not found for a cluster, the cluster can be broken into its constituent events for further processing. This can be performed by subsequent blocks as described below.

In accordance with one aspect, resolution logic 1320 can utilize an exhaustive lookup table (LUT) with entries corresponding to all combinations of radios in all potential clusters. Alternatively, a progressive resolution (PR) graph can be utilized, wherein nodes are defined for respective combinations of radio frequency (RF) knobs associated with respective radios (e.g., denoted by parameters of the radios) that can lead to a potential resolution and connections between parameters in respective radios are defined if the corresponding settings allow the radios to coexist. In such an example, an overall resolution can be obtained by finding a connected component of the graph, as traversing the connected component would lead to a set of parameter settings that allows the whole composite event to coexist. In one example, the input to a resolution graph constructed in this manner can include pairwise resolutions between various parameters of respective radios.

Upon processing by resolution logic 1320, respective clusters for which a resolution is not initially found can be further passed through a compatible subset generation (CSG) block 1330, which can find the compatible subsets of a composite event corresponding to a cluster that cannot be jointly allowed. Upon generation of such subsets, the respective subsets can be provided to a priority computation block 1340. As it can be appreciated that subsets generated by CSG block 1330 for a given cluster are mutually exclusive, priority computation block 1340 can select a subset to grant from the mutually exclusive subsets. In one example, a choice between subsets as performed by priority computation block 1340 can be based on priorities of the respective subsets (e.g., based on information provided by an event and radio priority table 1350 or the like).

In accordance with one aspect, as different subsets can contain different radios, priority computation block 1340 can normalize the priorities of respective radio events by dividing the events into bins such that, for example, events in the same bin are substantially the same priority across radios. For example, bins can be created for acquisition bins from all radios, radio events that lead to a connection loss, and so on. While binning provides a form of coarse prioritization, however, it can be appreciated that more than one subset can have events falling in the same bin. In this case, priority computation block 1340 can arbitrate the events to meet long-term grant targets based on relative priorities assigned to the bins.

In accordance with another aspect, system 1300 can operate in an iterative manner to provide confirmation that a selected subset of radio events can coexist. In one example, the operation of CSG block 1330 can be configured such that coexistence of respective generated subsets is not guaranteed. For example, if CSG block 1330 utilizes a simple subset generation algorithm, generated subsets can be passed back to resolution logic 1320 to determine whether the events in the subsets can actually coexist. If the events cannot coexist, the subset can be discarded. Alternatively, if CSG block 1330 is configured to generate only subsets that are guaranteed to coexist, this iterative process can be omitted.

Figure 14:
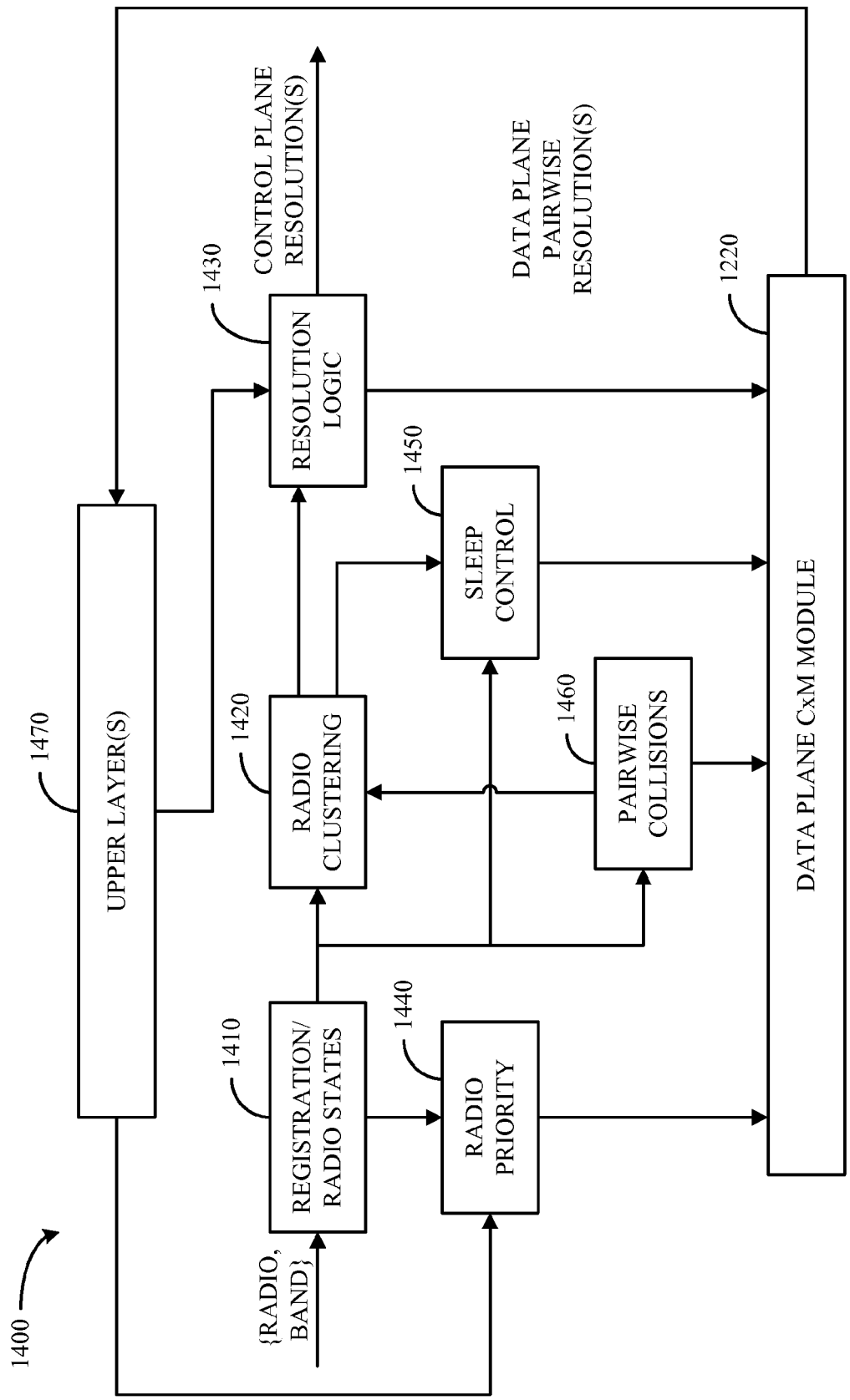

With reference next to system 1400 in FIG. 14, operation of an example control plane CxM architecture is illustrated. Operation of system 1400 can begin at a registration block 1400 by registering users and obtaining their updated state(s). In one example, when respective radios are turned on or otherwise enabled, they can be configured to register with registration block 1400. During such registration, system 1400 can advertise a current used protocol, based on which registration can be performed. During registration, a radio can provide one or more static parameters such as a frequency band (e.g., to define piecewise collisions), maximum transmit powers, any periodic events (e.g., periodically sent pilots) the radio utilizes, potential RF knobs of the radio, or the like. In another example, in the event that a radio changes its state (e.g., from active to sleep), it can be configured to update system 1400.

In accordance with one aspect, based on knowledge of which radios are enabled and their states, a pairwise collision block 1460 and/or other suitable means at system 1400 can determine pairwise collisions and/or pairwise resolutions (e.g., deeming some radio combinations irresolvable if needed) between radios using a predefined lookup table. In one example, this information can be passed to a data plane CxM module 1220 to configure its functionality. In another example, one or more other parameters such as radio scaling factors, priority binning information, and/or acceptable costs for resolutions can also be forwarded to data plane CxM module 1220. As further shown in system 1400, a radio clustering block 1420 can be utilized to define radio clustering during registration in accordance with various aspects described herein.

In accordance with a further aspect, data plane CxM module 1220 can be provided with radio priority information via a radio priority block 1440. Such information can include relative priorities of respective radios, priorities of respective constituent atomic events, or the like. In another example, resolution logic 1430 can provide data plane CxM module 1220 with a resolution table corresponding to respective associated radios. In a further example, a sleep control block 1450 and/or other suitable mechanisms within 1400 can control sleep functionality of system 1400 and/or data plane CxM module 1220.

In accordance with a further aspect, system 1400 in some cases can collect and analyze information obtained from data plane CxM module 1220 and utilize such information along with clusters generated by radio clustering block 1420 to generate long-term resolutions between radios via resolution logic 1430 and/or other suitable means. For example, if one or more radios are latency tolerant and allow coexistence solutions on a relatively slow scale (e.g., on the scale of software cycles), resolution procedures can be performed by resolution logic 1430 that are similar to those that can be performed by data plane resolution logic. In one example, long-term resolutions can also be conducted by system 1400 in the event that conflicts between respective radios are found to occur at above a threshold frequency (e.g., as determined based on event conflict data obtained from data plane CxM module 1220).

In the other direction, data plane CxM module 1220 can send information to be used by system 1400 and/or upper layer(s) 1470. For example, data plane CxM module 1220, having visibility to the radios, can provide information relating to the link quality of respective radios (e.g., including the coexistence impact on or by the radios). This information can be used by an associated connection manager (CnM) and/or other mechanisms in defining traffic to place on respective radios. In another example, data plane CxM module 1220 can send additional information to optimize CxM performance. For example, passing respective notification events can assist system 1400 in identifying particular receiver RSSI values, average transmit power on respective transmitters, or the like, which can assist in creating relatively long-term solutions such as inter-frequency handoff on one radio or selection of a discontinuous transmission (DTX)/discontinuous reception (DRX) setting that can minimize collisions. Meanwhile, it can be appreciated that forwarding resolutions can assist system 1400 in determining a pattern of resolutions that repeat. In one example, such resolutions can be cached and used without requiring traversal of the whole CxM path every time a periodic collision occurs.

In another aspect, system 1400 can facilitate interaction with one or more entities associated with upper layer(s) 1470. By way of example, system 1400 can provide respective information to upper layer(s) 1470, which in turn can utilize a connectivity engine and/or other means to identify whether it is utilizing an application on a radio with a coexistence issue and, if so, to decide whether to move that application to another radio. Additionally or alternatively, system 1400 and upper layer(s) 1470 can coordinate with respect to any suitable operation(s) (e.g., changes in radio technology, etc.). In another example, upper layer(s) 1470 can provide information to be utilized by system 1400 in managing radio coexistence. Thus, by way of example, upper layer(s) 1470 can provide information to system 1400 relating to how to set relative priorities between radios, such that factors such as applications to be utilized, operating interferences, etc., can be considered in setting the priorities for different radios. In this manner, it can be appreciated that system 1400 can act as a conduit to take priorities from upper layer(s) 1470 and to generate and/or set one or more configuration parameters for data plane CxM module 1220 based on such priorities and/or other information from upper layer(s) 1470.

Figure 15:
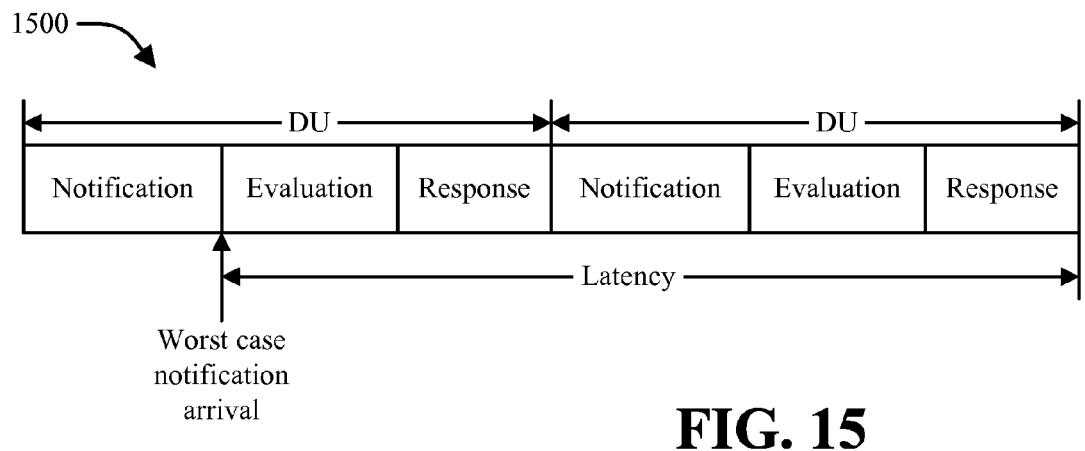
FIG. 15 illustrates operation of an example coexistence manager in time.

Turning to diagram 1500 in FIG. 15, an example timeline for CxM operation is illustrated. In one example, a CxM can operate according to a timeline divided into decision units (DUs) in time, which can be any suitable uniform or non-uniform length (e.g., 100 μs). By way of specific example, a DU can be divided into a notification phase (e.g., 50 μs) where various radios send notifications of imminent events, an evaluation phase (e.g., 30 μs) where notifications are processed, and a response phase (e.g., 20 μs) where commands are provided to various radios and/or other operations are performed based on actions taken in the evaluation phase. In one example, timeline 1500 can have a latency parameter defined by the worst case operation of timeline 1500, e.g., the timing of a response in the case that a notification is obtained from a given radio immediately following termination of the notification phase in a given DU.

Figure 16:
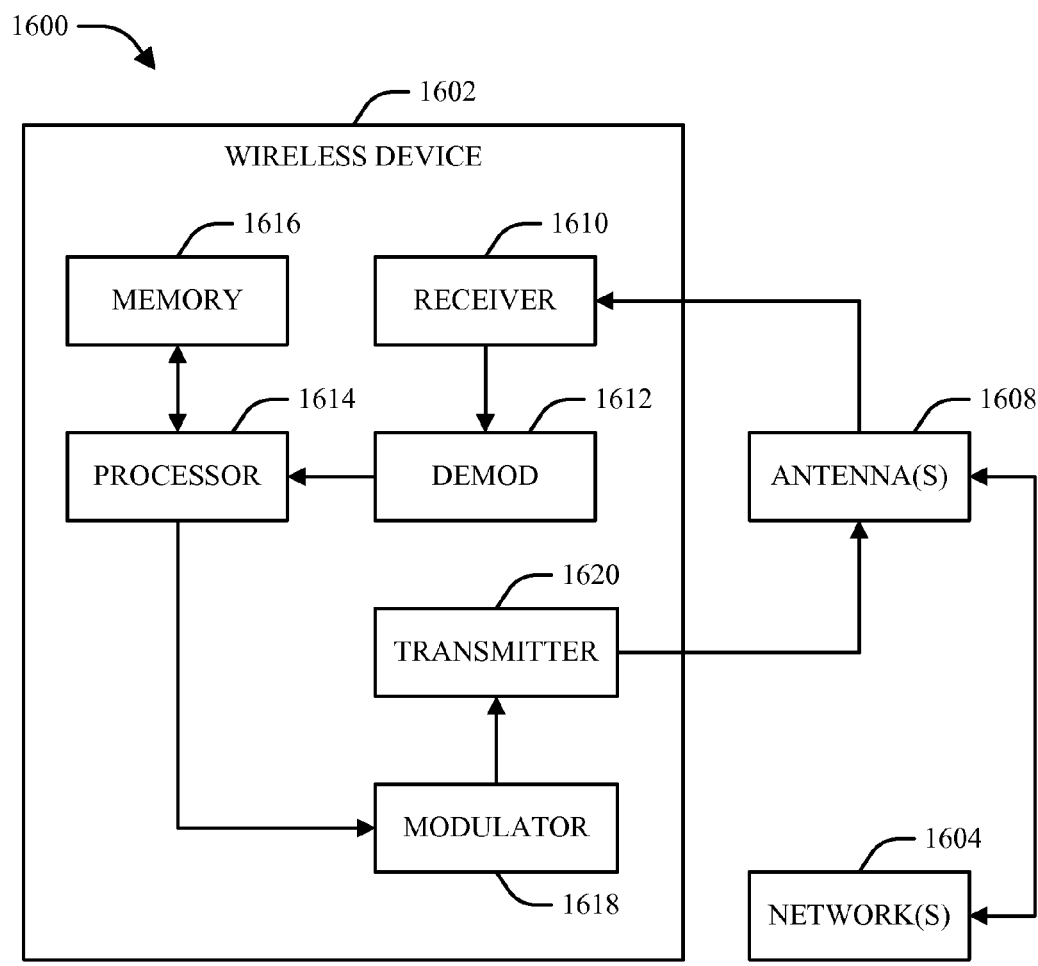
FIG. 16 is a block diagram of an example wireless communication device that can be utilized to implement various aspects described herein.

FIG. 16 is a block diagram of a system 1600 that can be utilized to implement various aspects of the functionality described herein. In one example, system 1600 includes a wireless device 1602. As illustrated, wireless device 1602 can receive signal(s) from one or more networks 1604 and transmit to the one or more networks 1604 via one or more antennas 1608. Additionally, wireless device 1602 can comprise a receiver 1610 that receives information from antenna(s) 1608. In one example, receiver 1610 can be operatively associated with a demodulator (Demod) 1612 that demodulates received information. Demodulated symbols can then be analyzed by a processor 1614. Processor 1614 can be coupled to memory 1616, which can store data and/or program codes related to terminal 1602. Additionally, wireless device 1602 can employ processor 1614 to perform methodologies 800-1000 and/or other similar and appropriate methodologies. Wireless device 1602 can also include a modulator 1618 that can multiplex a signal for transmission by a transmitter 1620 through antenna(s) 1608.

With respect to the above description, one of ordinary skill in the art can appreciate that various aspects described above can be implemented by hardware, software, firmware, middleware, microcode, or any combination thereof. When the systems and/or methods are implemented in software, firmware, middleware or microcode, program code or code segments, they can be stored in a machine-readable medium, such as a memory or storage device. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

Moreover, those of skill in the art can appreciate that information and signals can be represented using any of a variety of different technologies and techniques. For example, data, instructions, commands, information, signals, bits, symbols, and/or chips that may be referenced throughout the above description can be represented by voltages, currents, electromagnetic waves, magnetic fields or particles, optical fields or particles, or any combination thereof.

In addition, it is to be understood that the steps of the various methods and/or algorithms as described in connection with the disclosure above can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An example storage medium can be coupled to a processor such that the processor can read information from, and write information to, the storage medium. In the alternative, the storage medium can be integral to the processor. The processor and the storage medium can reside in an ASIC, which in turn can reside in a user terminal and/or in any other suitable location. Alternatively, processor and the storage medium can reside as discrete components in a user terminal.

The above description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is instead to be accorded the widest scope consistent with the principles and novel features disclosed herein. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for radio filtering, comprising:
   identifying a set of transceivers to be resolved on a multi-radio wireless device;
   obtaining information relating to potential pairwise collisions between respective transceivers in the set of transceivers on the multi-radio wireless device; and
   dividing the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster.

2. The method of claim 1, wherein the identifying comprises:
   receiving information relating to a set of events to be executed at a given time interval by the set of transceivers to be resolved; and
   identifying one or more events in the set of events to evaluate in the given time interval based on the received information relating to the set of events.

3. The method of claim 2, wherein the given time interval comprises a current decision unit (DU) and the set of events comprises one or more of an immediate event that starts at a next DU, an ongoing event that started in a past DU and executes through the current DU, or a future event that starts subsequent to the next DU and potentially conflicts with one or more of the immediate event or the ongoing event.

4. The method of claim 1, wherein the dividing comprises:
   generating a graph comprising nodes corresponding to respective transceivers in the set of transceivers and edges connecting respective nodes and corresponding to potential pairwise collisions between the respective transceivers corresponding to the respective nodes connected with the edges; and
   generating the respective non-overlapping clusters based at least in part on one or more maximal connected subgraphs of the graph.

5. The method of claim 4, wherein:
   the generating a graph comprises constructing nodes corresponding to one or more transmit components and nodes corresponding to one or more receive components of one or more of the respective transceivers in the set of transceivers; and
   the dividing comprises dividing the set of transceivers into respective non-overlapping resolution clusters that distinguish between the one or more transmit components and the one or more receive components of the one or more respective transceivers.

6. The method of claim 4, wherein:
   the generating a graph comprises constructing nodes corresponding to one or more transmit components and one or more receive components of the one or more of the respective transceivers in the set of transceivers that are operating in one or more of an active mode or a sleep mode; and
   the dividing comprises dividing the set of transceivers into respective non-overlapping sleep clusters that regard the one or more transmit components and the one or more receive components of the one or more respective transceivers as a single entity.

7. The method of claim 4, wherein the generating a graph comprises:
constructing a combination node corresponding to a plurality of aggressor transceivers that can jointly collide with one or more victim transceivers;
constructing a plurality of constituent nodes respectively corresponding to the plurality of aggressor transceivers that can jointly collide with the one or more victim transceivers; and
constructing edges connecting the combination node to the plurality of constituent nodes.

8. The method of claim 1, further comprising building one or more resolution tables based at least in part on the respective non-overlapping clusters dividing the set of transceivers.

9. The method of claim 8, wherein the building comprises:
obtaining information relating to one or more respective subsets of potentially conflicting transceivers in the set of transceivers; and
generating the one or more resolution tables corresponding to the one or more respective subsets of potentially conflicting transceivers for which the information is obtained.

10. The method of claim 9, wherein:
the obtaining information comprises generating a graph comprising nodes that represent transmit or receive components of respective transceivers in the set of transceivers and edges that connect respective nodes and represent potential pairwise collisions between the transmit or receive components of the respective transceivers that correspond to the respective nodes and finding respective connected subgraphs in the graph; and
the generating the one or more resolution tables comprises creating the one or more resolution tables for the respective connected subgraphs found in the graph.

11. The method of claim 1, wherein the set of transceivers comprises at least one radio.

12. A method for radio filtering, comprising:
identifying a set of transceivers to be resolved on a multi-radio wireless device;
obtaining information relating to potential pairwise collisions between respective transceivers in the set of transceivers on the multi-radio wireless device; and
dividing the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster, wherein the dividing comprises:
generating a graph comprising nodes that represent respective transceivers in the set of transceivers and edges that connect respective nodes and represent potential pairwise collisions between the respective transceivers that correspond to the respective nodes connected with the edges; and
generating the respective non-overlapping clusters based at least in part on one or more maximal connected subgraphs of the graph, wherein the generating respective non-overlapping clusters comprises:
initializing a primary transceiver set to initially contain substantially no transceivers and a secondary transceiver set to initially contain substantially all transceivers represented in the graph;
selecting a node in the graph corresponding to a transceiver in the secondary transceiver set;
identifying respective nodes in the graph that are connected to the selected node in the graph;
moving respective transceivers corresponding to the selected node and the respective nodes that are connected to the selected node from the secondary transceiver set to the primary transceiver set;
iterating the selecting a node, the identifying respective nodes, and the moving respective transceivers with respect to additional nodes corresponding to one or more of transceivers or combinations of transceivers in the primary transceiver set until substantially no further nodes are identified; and
generating a cluster based on respective transceivers in the primary transceiver set upon completion of the iterating.

13. The method of claim 12, wherein the generating respective non-overlapping clusters further comprises:
emptying the primary transceiver set upon completion of the generating a cluster; and
performing the selecting a node, the identifying respective nodes, the moving respective transceivers, the iterating, and the generating a cluster in an iterative manner until substantially all transceivers are removed from the secondary transceiver set.

14. A method for radio filtering, comprising:
identifying a set of transceivers to be resolved on a multi-radio wireless device;
obtaining information relating to potential pairwise collisions between respective transceivers in the set of transceivers on the multi-radio wireless device;
dividing the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster; and
building one or more resolution tables that correspond to one or more respective subsets of potentially conflicting transceivers in the set of transceivers based at least in part on the respective non-overlapping clusters dividing the set of transceivers, wherein building the one or more resolution tables comprises:
generating a graph to obtain information relating to the one or more respective subsets of potentially conflicting transceivers, wherein the generated graph comprises nodes that represent respective transceivers in the set of transceivers and edges that connect respective nodes and represent potential pairwise collisions between the respective transceivers that correspond to the respective nodes connected with the edges:
finding respective connected subgraphs in the graph, wherein finding the respective connected subgraphs comprises:
identifying second order collisions between respective transceivers in the set of transceivers based at least in part on respective pairs of nodes in the graph that are connected via the edges;
determining additional nodes in the graph that are connected to the respective pairs of nodes via one or more of the edges that represent previously identified collisions between the respective transceivers represented in the graph;

identifying respective collisions represented in the graph corresponding to respective connected subgraphs in the graph that include the previously identified collisions and the determined additional connected nodes; and iterating the determining additional nodes and the identifying respective collisions until substantially no further collisions between the respective transceivers represented in the graph are identified; and creating the one or more resolution tables for the respective connected subgraphs found in the graph based on the respective collisions identified from the graph.

15. A wireless communications apparatus, comprising:
a memory that stores data relating to a set of transceivers to be resolved on a multi-radio wireless device; and
a processor configured to obtain information relating to potential pairwise collisions between respective transceivers in the set of transceivers and to divide the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster.

16. The wireless communications apparatus of claim 15, wherein:
the memory further stores data relating to a set of events to be executed at a given time interval by the set of transceivers to be resolved; and
the processor is further configured to identify one or more events in the set of events to evaluate in the given time interval based on the data relating to the set of events stored in the memory to identify the set of transceivers to be resolved on the multi-radio wireless device.

17. The wireless communications apparatus of claim 16, wherein the given time interval comprises a current decision unit (DU) and the set of events comprises one or more of an immediate event that starts at a next DU, an ongoing event that started in a past DU and executes through the current DU, or a future event that starts subsequent to the next DU and potentially conflicts with one or more of the immediate event or the ongoing event.

18. The wireless communications apparatus of claim 15, wherein the processor is further configured to generate a graph comprising nodes corresponding to respective transceivers in the set of transceivers and edges connecting respective nodes and corresponding to potential pairwise collisions between the respective transceivers corresponding to the respective nodes connected with the edges and to generate the respective non-overlapping clusters based at least in part one one or more maximal connected subgraphs of the graph.

19. The wireless communications apparatus of claim 18, wherein the processor is further configured to construct nodes in the graph corresponding to one or more transmit components and nodes corresponding to one or more receive components of one or more of the respective transceivers in the set of transceivers and to divide the set of transceivers into respective non-overlapping resolution clusters that distinguish between the one or more transmit components and the one or more receive components of the one or more respective transceivers.

20. The wireless communications apparatus of claim 18, wherein the processor is further configured to construct nodes in the graph corresponding to one or more transmit components and one or more receive components of the one or more of the respective transceivers in the set of transceivers that are operating in one or more of an active mode or a sleep mode and to divide the set of transceivers into respective non-overlapping sleep clusters that regard the one or more transmit components and the one or more receive components of the one or more respective transceivers as a single entity.

21. The wireless communications apparatus of claim 18, wherein the processor is further configured to construct a combination node in the graph corresponding to a plurality of aggressor transceivers that can jointly conflict with one or more victim transceivers, to construct a plurality of constituent nodes in the graph respectively corresponding to the plurality of aggressor transceivers that can jointly collide with the one or more victim transceivers, and to construct edges in the graph connecting the combination node to the plurality of constituent nodes.

22. The wireless communications apparatus of claim 15, wherein the processor is further configured to build one or more resolution tables based at least in part on the respective non-overlapping clusters dividing the set of transceivers.

23. The wireless communications apparatus of claim 22, wherein the processor is further configured to obtain information relating to one or more respective subsets of potentially conflicting transceivers in the set of transceivers and to generate the one or more resolution tables corresponding to the one or more respective subsets of potentially conflicting transceivers for which the information is obtained.

24. The wireless communications apparatus of claim 23, wherein the processor is further configured to generate a graph nodes comprising nodes that represent transmit or receive components of respective transceivers in the set of transceivers and edges that connect respective nodes and represent potential pairwise collisions between the transmit or receive components of the respective transceivers that correspond to the respective nodes, to find respective connected subgraphs in the graph, and to create the one or more resolution tables for the respective connected subgraphs found in the graph.

25. The wireless communications apparatus of claim 15, wherein the set of transceivers comprises at least one radio.

26. A wireless communications apparatus, comprising:
a memory that stores data relating to a set of transceivers to be resolved on a multi-radio wireless device; and
a processor further configured to obtain information relating to potential pairwise collisions between respective transceivers in the set of transceivers and to divide the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster, wherein to divide the set of transceivers into the respective non-overlapping clusters, the processor is further configured to generate a graph comprising nodes that represent respective transceivers in the set of transceivers and edges that connect respective nodes and represent potential pairwise collisions between the respective transceivers that correspond to the respective nodes connected with the edges, initialize a primary transceiver set to initially contain substantially no transceivers and a secondary transceiver set to initially contains substantially all transceivers represented in the graph, select a node in the graph corresponding to a transceiver in the secondary transceiver set, identify respective nodes in the graph that are connected to the selected node in the graph, move respective transceivers corresponding to the selected node and the respective nodes that are connected to the selected node from the secondary transceiver set to the primary transceiver set, iteratively select a node, identify respective nodes that are connected to the selected node, and move respective transceivers with respect to additional nodes corresponding to one or more transceivers or combinations of transceivers in the primary transceiver set until substantially no further nodes are identified, and generate a cluster among the respective non-overlapping clusters based at least in part on one or more maximal connected subgraphs of the graph determined from respective transceivers in the primary transceiver set upon completion of the iterating.

27. The wireless communications apparatus of claim 26, wherein the processor is further configured to empty the primary transceiver set upon generating the cluster and to iteratively select respective nodes, identify nodes that are connected to the respective selected nodes, move respective transceivers between the primary transceiver set and the secondary transceiver set, and generate respective clusters until substantially all transceivers are removed from the secondary transceiver set.

28. A wireless communications apparatus comprising:
a memory that stores data relating to a set of transceivers to be resolved on a multi-radio wireless device; and
a processor further configured to obtain information relating to potential pairwise collisions between respective transceivers in the set of transceivers, to divide the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster, to generate a graph comprising nodes that represent respective transceivers in the set of transceivers and edges that connect respective nodes and represent potential pairwise collisions between the respective transceivers that correspond to the respective nodes connected with the edges, to identify second order collisions between respective transceivers in the set of transceivers based at least in part on respective pairs of nodes in the graph that are connected via the edges, to determine additional nodes in the graph that are connected to the respective pairs of nodes via one or more of the edges that represent previously identified collisions between the respective transceivers represented in the graph, to identify respective collisions represented in the graph corresponding to respective connected subgraphs in the graph that include the previously identified collisions and the determined additional connected nodes, to iteratively determine the additional nodes and identify the respective collisions until substantially no further collisions between the respective transceivers represented in the graph are identified, and to build one or more resolution tables that correspond to one or more respective subsets of potentially conflicting transceivers in the set of transceivers based at least in part on the respective connected subgraphs and the respective collisions identified from the graph.

29. An apparatus for radio filtering, comprising:
means for identifying a set of transceivers to be resolved on a multi-radio wireless device;
means for obtaining information relating to potential pairwise collisions between respective transceivers in the set of transceivers on the multi-radio wireless device; and
means for dividing the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster.

30. A computer-readable storage medium comprising instructions that, when executed on a processor, cause the processor to:
identify a set of transceivers to be resolved on a multi-radio wireless device;
obtain information relating to potential pairwise collisions between respective transceivers in the set of transceivers on the multi-radio wireless device; and
divide the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster.

31. An apparatus for radio filtering, comprising:
means for identifying a set of transceivers to be resolved on a multi-radio wireless device;
means for obtaining information relating to potential pairwise collisions between respective transceivers in the set of transceivers on the multi-radio wireless device; and
means for dividing the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster, wherein the means for dividing comprises:
means for generating a graph comprising nodes that represent respective transceivers in the set of transceivers and edges that connect respective nodes and represent potential pairwise collisions between the respective transceivers that correspond to the respective nodes connected with the edges; and
means for generating the respective non-overlapping clusters based at least in part on one or more maximal connected subgraphs of the graph, wherein the means for generating respective non-overlapping clusters comprises:
means for initializing a primary transceiver set to initially contain substantially no transceivers and a secondary transceiver set to initially contain substantially all transceivers represented in the graph;
means for selecting a node in the graph corresponding to a transceiver in the secondary transceiver set;
means for identifying respective nodes in the graph that are connected to the selected node in the graph;

means for moving respective transceivers corresponding to the selected node and the respective nodes that are connected to the selected node from the secondary transceiver set to the primary transceiver set;

means for iteratively invoking the means for selecting a node, the means for identifying respective nodes, and the means for moving respective transceivers with respect to additional nodes corresponding to one or more of transceivers or combinations of transceivers in the primary transceiver set until substantially no further nodes are identified; and means for generating a cluster based on respective transceivers in the primary transceiver set upon completion of the iterating.

32. A computer-readable storage medium comprising instructions that, when executed on a processor, cause the processor to:

identify a set of transceivers to be resolved on a multi-radio wireless device;

obtain information relating to potential pairwise collisions between respective transceivers in the set of transceivers; and divide the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster, wherein the instructions that cause the processor to divide the set of transceivers into the respective non-overlapping clusters further cause the processor to:

generate a graph comprising nodes that represent respective transceivers in the set of transceivers and edges that connect respective nodes and represent potential pairwise collisions between the respective transceivers that correspond to the respective nodes connected with the edges;

initialize a primary transceiver set to initially contain substantially no transceivers and a secondary transceiver set to initially contains substantially all transceivers represented in the graph;

select a node in the graph corresponding to a transceiver in the secondary transceiver set;

identify respective nodes in the graph that are connected to the selected node in the graph;

move respective transceivers corresponding to the selected node and the respective nodes that are connected to the selected node from the secondary transceiver set to the primary transceiver set;

iteratively select a node, identify respective nodes that are connected to the selected node, and move respective transceivers with respect to additional nodes corresponding to one or more transceivers or combinations of transceivers in the primary transceiver set until substantially no further nodes are identified; and generate a cluster among the respective non-overlapping clusters based at least in part on one or more maximal connected subgraphs of the graph determined from respective transceivers in the primary transceiver set upon completion of the iterating.

33. An apparatus for radio filtering, comprising:

means for identifying a set of transceivers to be resolved on a multi-radio wireless device;

means for obtaining information relating to potential pairwise collisions between respective transceivers in the set of transceivers;

means for dividing the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster;

means for generating a graph comprising nodes that represent respective transceivers in the set of transceivers and edges that connect respective nodes and represent potential pairwise collisions between the respective transceivers that correspond to the respective nodes connected with the edges;

means for identifying second order collisions between respective transceivers in the set of transceivers based at least in part on respective pairs of nodes in the graph that are connected via the edges;

means for determining additional nodes in the graph that are connected to the respective pairs of nodes via one or more of the edges that represent previously identified collisions between the respective transceivers represented in the graph;

means for identifying respective collisions represented in the graph corresponding to respective connected subgraphs in the graph that include the previously identified collisions and the determined additional connected nodes;

means for iteratively invoking the means for determining the additional nodes and the means for identifying the respective collisions until substantially no further collisions between the respective transceivers represented in the graph are identified; and means for building one or more resolution tables that correspond to one or more respective subsets of potentially conflicting transceivers in the set of transceivers based at least in part on the respective connected subgraphs and collisions identified from the graph.

34. A computer-readable storage medium comprising instructions that, when executed on a processor, cause the processor to:

identify a set of transceivers to be resolved on a multi-radio wireless device;

obtain information relating to potential pairwise collisions between respective transceivers in the set of transceivers;

divide the set of transceivers into respective non-overlapping clusters of one or more transceivers such that respective transceivers in the set of transceivers are associated with a single cluster among the respective non-overlapping clusters and respective transceivers that are associated with a given cluster among the respective non-overlapping clusters do not exhibit potential pairwise collisions with respective transceivers not associated with the given cluster;

generate a graph comprising nodes that represent respective transceivers in the set of transceivers and edges that connect respective nodes and represent potential pairwise collisions between the respective transceivers that correspond to the respective nodes connected with the edges;

identify second order collisions between respective transceivers in the set of transceivers based at least in part on respective pairs of nodes in the graph that are connected via the edges;

determine additional nodes in the graph that are connected to the respective pairs of nodes via one or more of the edges that represent previously identified collisions between the respective transceivers represented in the graph;

identify respective collisions represented in the graph corresponding to respective connected subgraphs in the graph that include the previously identified collisions and the determined additional connected nodes;

iteratively determine the additional nodes and identify the respective collisions until substantially no further collisions between the respective transceivers represented in the graph are identified; and build one or more resolution tables that correspond to one or more respective subsets of potentially conflicting transceivers in the set of transceivers based at least in part on the respective connected subgraphs and collisions identified from the graph.

* * * * *